(12) United States Patent
Kawasaki

(10) Patent No.: US 11,767,443 B2
(45) Date of Patent: Sep. 26, 2023

(54) COPPER PARTICLE MIXTURE AND METHOD FOR MANUFACTURING SAME, COPPER PARTICLE MIXTURE DISPERSION, INK CONTAINING COPPER PARTICLE MIXTURE, METHOD FOR STORING COPPER PARTICLE MIXTURE, AND METHOD FOR SINTERING COPPER PARTICLE MIXTURE

(71) Applicant: THE SCHOOL CORPORATION KANSAI UNIVERSITY, Suita (JP)

(72) Inventor: Hideya Kawasaki, Suita (JP)

(73) Assignee: THE SCHOOL CORPORATION KANSAI UNIVERSITY, Suita (JP)

(*) Notice: Subject to any disclaimer, the term of this patent is extended or adjusted under 35 U.S.C. 154(b) by 826 days.

(21) Appl. No.: 16/604,046

(22) PCT Filed: Apr. 5, 2018

(86) PCT No.: PCT/JP2018/014637
§ 371 (c)(1),
(2) Date: Dec. 20, 2019

(87) PCT Pub. No.: WO2018/190246
PCT Pub. Date: Oct. 18, 2018

(65) Prior Publication Data
US 2020/0131392 A1    Apr. 30, 2020

(30) Foreign Application Priority Data
Apr. 14, 2017 (JP) .................... 2017-080971

(51) Int. Cl.
B22F 9/24      (2006.01)
B22F 1/054    (2022.01)
(Continued)

(52) U.S. Cl.
CPC .............. C09D 11/52 (2013.01); B22F 1/052 (2022.01); B22F 1/054 (2022.01); B22F 1/0545 (2022.01);
(Continued)

(58) Field of Classification Search
CPC ....... C09D 11/52; C09D 11/037; B22F 1/054; B22F 1/16; B22F 9/24; B22F 2301/10;
(Continued)

(56) References Cited

U.S. PATENT DOCUMENTS 9,744,595 B2    8/2017  Fukumoto et al.
10,214,656 B2   2/2019  Kawasaki et al.
(Continued)

FOREIGN PATENT DOCUMENTS

CN    104759725 A    7/2015
CN    103639614 B    8/2016
(Continued)

OTHER PUBLICATIONS

Office Action dated Mar. 26, 2021, issued in counterpart CN Application No. 201880032254.8, with English Translation. (16 pages).

*Primary Examiner* — Rebecca Janssen
(74) *Attorney, Agent, or Firm* — WHDA, LLP

(57) ABSTRACT

A copper particle mixture ensures suppression of copper oxidation and high dispersibility, and that can be sintered at a low temperature in a short period of time can suitably be used for a conductive copper ink material. The copper particle mixture contains copper fine particle A and copper nanoparticle B, the copper fine particle A having an average particle diameter of 0.1 μm to 5 μm, and being coated with at least one dicarboxylic acid selected from the group consisting of malonic acid and oxalic acid, the copper nanoparticle B comprising a central portion comprising a (Continued)

copper single crystal, and a protective layer surrounding the central portion, and having an average particle diameter of 1 nm to 100 nm, and the protective layer of the copper nanoparticle B containing at least one member selected from the group consisting of $C_{3-6}$ primary alcohols, $C_{3-6}$ secondary alcohols, and derivatives thereof.

12 Claims, 12 Drawing Sheets

(51) Int. Cl.
    *B22F 1/0545*      (2022.01)
    *B22F 1/052*      (2022.01)
    *B22F 1/102*      (2022.01)
    *C09D 11/52*      (2014.01)
    *C09D 11/037*      (2014.01)
    *B22F 1/103*      (2022.01)

(52) U.S. Cl.
    CPC .............. *B22F 1/102* (2022.01); *B22F 1/103* (2022.01); *B22F 9/24* (2013.01); *C09D 11/037* (2013.01); *B22F 2301/10* (2013.01)

(58) Field of Classification Search
    CPC ........ B22F 1/052; B22F 1/0545; B22F 1/102; B22F 1/103; C22C 1/0425; C22C 9/00
    See application file for complete search history.

(56) References Cited

U.S. PATENT DOCUMENTS

| | | | |
|---|---|---|---|
| 2016/0121432 A1* | 5/2016 | Watanabe | B23K 35/365 |
| | | | 148/24 |
| 2017/0043404 A1 | 2/2017 | Fukumoto et al. | |
| 2017/0073538 A1* | 3/2017 | Kawasaki | C09D 11/00 |
| 2017/0113306 A1* | 4/2017 | Ghoshal | B23K 35/3613 |
| 2018/0036805 A1 | 2/2018 | Fukumoto et al. | |

FOREIGN PATENT DOCUMENTS

| | | | | |
|---|---|---|---|---|
| CN | 106457407 A | 2/2017 | | |
| JP | 2014-047415 A | 3/2014 | | |
| JP | 2016-093830 A | 5/2016 | | |
| KR | 2016-0027452 A | 3/2016 | | |
| TW | 201503983 A | 2/2015 | | |
| WO | 2015/053833 A2 | 4/2015 | | |
| WO | 2015/129466 A1 | 9/2015 | | |
| WO | WO-2015129466 A1 * | 9/2015 | ............ | B22F 1/0018 |

* cited by examiner

COPPER PARTICLE MIXTURE AND METHOD FOR MANUFACTURING SAME, COPPER PARTICLE MIXTURE DISPERSION, INK CONTAINING COPPER PARTICLE MIXTURE, METHOD FOR STORING COPPER PARTICLE MIXTURE, AND METHOD FOR SINTERING COPPER PARTICLE MIXTURE

TECHNICAL FIELD

The present invention relates to a copper particle mixture, and a method for producing the copper particle mixture; a copper particle mixture dispersion; an ink containing a copper particle mixture; a method for preserving a copper particle mixture; and a method for sintering a copper particle mixture.

BACKGROUND ART

Metal nanoparticles of about 2 nm to 100 nm in diameter have characteristics different from those of bulk metal, in terms of optical properties, magnetic properties, heat properties, electrical properties, and the like. Therefore, such nanoparticles are expected to be applied in various technical fields. For example, taking advantage of the properties such that a smaller particle size has a larger surface area and decreases the melting point, research on the production of electronic circuits comprising a fine metal wire on substrates using fine-wire printing ink containing metal nanoparticles has proceeded.

Fine-wire printing ink is made of, as an ink material, a dispersion containing metal nanoparticles having a surface protected by an organic substance. A circuit pattern is printed on a substrate by using a fine-wire printing technique, and heated at a low temperature to thereby remove the organic substance from the surface of the metal nanoparticles, thereby causing metal bonds between the metal nanoparticles. In particular, when metal nanoparticles having a diameter of 10 nm or less are used, the melting point is significantly reduced. Thus, a fine metal wire having high thermal conductivity and electrical conductivity can be formed.

Bulk copper has been used for metal wires. However, bulk copper has disadvantages such as easy oxidation, decrease in conductivity, high sintering temperature, and the like. In contrast, the sintering temperature for copper nanoparticles is lower than that for bulk copper; therefore, copper nanoparticles are expected to be a material capable of forming fine metal wire on a substrate vulnerable to heat, such as paper or plastic.

However, copper nanoparticles are aggregated more easily than other metal nanoparticles, such as gold and silver, and the aggregate has a particle diameter of several tens of nm to several hundreds of nm; therefore, it is difficult to synthesize monodisperse copper nanoparticles having an average particle diameter of 10 nm or less, which are particularly useful as an ink material.

Copper nanoparticles having an average particle diameter of 10 nm or less with a remarkable reduction in the melting point are desired as a nanoink material that can form a fine metal wire on a substrate vulnerable to heat, such as paper or plastic; however, it is difficult to obtain copper nanoparticles that can be sintered at a low temperature in a range of 150° C. or less. This is because copper nanoparticles having an average particle diameter of 10 nm or less are highly reactive, and thus unstable; consequently, oxidation and aggregation of the copper nanoparticles easily occur. It is difficult to stably preserve such copper nanoparticles even immediately after the copper nanoparticles are obtained. Therefore, microscopic copper nanoparticles having an average particle diameter of 10 nm are produced using, as a protective agent, a polymer or the like that strongly binds to the copper surface. However, there is a problem such that this protective agent cannot be completely removed during low-temperature heating, leading to a reduction in the electrical conductivity of the fine metal wire.

Further, when fine metal wire is formed using copper nanoparticles, the copper in the fine wire is oxidized and thus ionized. This may cause a phenomenon called migration, in which the copper nanoparticles travels on the insulator of the substrate, thereby inducing short circuit.

As a fine-wire printing ink material that can solve the problems described above, copper nanoparticles having a central portion comprising a copper single crystal and a protective layer surrounding the central portion have been suggested. The copper nanoparticles (1) have an average particle diameter of 10 nm or less; (2) the protective layer contains at least one member selected from $C_{3-6}$ primary alcohols, $C_{3-6}$ secondary alcohols, and derivatives thereof; and (3) the protective layer has a boiling point or thermal decomposition temperature of 150° C. or less (see, for example, Patent Literature 1).

The copper nanoparticles described in Patent Document 1 are excellent in suppression of copper oxidation, decrease in melting point, and dispersibility; and may be sintered at a low temperature. Moreover, the protective layer can be removed upon low-temperature sintering at 150° C. or less; the copper nanoparticles can thus be suitably used for a conductive copper nanoink material. However, to achieve further decrease in sintering temperature, more investigation may be necessary. There are demands that the fine-wire printing ink material can be sintered at a low temperature range of 120° C. or less in a non-reducing atmosphere, and that the fine-wire printing ink material can be sintered in a short period of time at a low temperature of 150° C. or less, even in a reducing atmosphere such as air.

Accordingly, there has been a demand for development of a copper particle mixture having high dispersibility with reduced copper oxidation, that can be sintered at a low temperature in a short period of time under a reducing or non-reducing atmosphere, and therefore can suitably be used for a conductive copper ink material; a copper particle mixture dispersion in which the copper particle mixture is dispersed; and an ink containing copper particle mixture containing the copper particle mixture dispersion. There has also been a demand for a method for stably preserving the copper particle mixture.

CITATION LIST

Patent Literature

Patent Literature 1: International Publication WO2015/053833

SUMMARY OF INVENTION

Technical Problem

An object of the present invention is to provide a copper particle mixture that ensures suppression of copper oxidation and high dispersibility, and that can be sintered at a low temperature in a short period of time under a reducing or non-reducing atmosphere, and therefore can suitably be used for a conductive copper ink material; a production method thereof; a copper particle mixture dispersion in which the copper particle mixture is dispersed; and a copper particle mixture-containing ink comprising the copper particle mixture dispersion.

Another object of the present invention is to provide a method for sintering the copper particle mixture.

Solution to Problem

The inventors of the present invention conducted extensive research, and found that the object of the invention described above can be achieved by using a copper particle mixture comprising copper fine particle A and copper nanoparticle B, in which the copper fine particle A has an average particle diameter of not less than 0.1 μm and not more than 5 μm, and the particles thereof are coated with a specific dicarboxylic acid; and the copper nanoparticle B has a central portion comprising a copper single crystal, and a protective layer surrounding the central portion, has an average particle diameter of not less than 1 nm and less than 100 nm, and in which the protective layer comprises a specific alcohol and the like. With this finding, the inventors completed the present invention.

Specifically, the present invention relates to the following copper particle mixture, the copper particle mixture dispersion, the copper particle mixture-containing ink, the method for producing a copper particle mixture, and a method for sintering a copper particle mixture.

Item 1. A copper particle mixture comprising copper fine particle A and copper nanoparticle B,
the copper fine particle A having an average particle diameter of not less than 0.1 μm and not more than 5 μm, and being coated with at least one dicarboxylic acid selected from the group consisting of malonic acid and oxalic acid,
the copper nanoparticle B comprising a central portion comprising a copper single crystal, and a protective layer surrounding the central portion, and having an average particle diameter of not less than 1 nm and less than 100 nm, and
the protective layer of the copper nanoparticle B containing at least one member selected from the group consisting of $C_{3-6}$ primary alcohols, $C_{3-6}$ secondary alcohols, and derivatives thereof.

Item 2. The copper particle mixture according to item 1, wherein the standard deviation based on particle size distribution of the copper nanoparticle B is 20% or less of the average particle diameter of copper nanoparticle B.

Item 3. The copper particle mixture according to item 1 or 2, wherein the mass ratio of the protective layer in the copper nanoparticle B is 10 to 30 mass %, based on 100 mass % of the copper nanoparticle B.

Item 4. The copper particle mixture according to any one of items 1 to 3, wherein the at least one member selected from the group consisting of $C_{3-6}$ primary alcohols, $C_{3-6}$ secondary alcohols, and derivatives thereof has a group represented by the following formula (1) or (2):

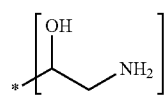

(1)

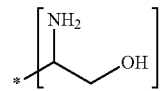

(2)

wherein in formulas (1) and (2), the asterisk (*) represents a bonding hand.

Item 5. The copper particle mixture according to any one of items 1 to 4, wherein the ratio of the mass (Mb) of the copper nanoparticle B to the total (Ma+Mb) of the mass (Ma) of the copper fine particle A and the mass (Mb) of the copper nanoparticle B is 2 mass % or more.

Item 6. A copper particle mixture dispersion in which the copper particle mixture according to any one of items 1 to 5 is dispersed in a dispersion medium.

Item 7. A copper particle mixture-containing ink comprising the copper particle mixture dispersion according to item 6.

Item 8. A method for sintering a copper particle mixture, the method comprising sintering the copper particle mixture according to any one of items 1 to 5 in a non-reducing atmosphere under ordinary pressure or reduced pressure, at a temperature of 120° C. or less.

Item 9. A method for sintering a copper particle mixture, the method comprising sintering the copper particle mixture according to any one of items 1 to 5 in the air under ordinary pressure, at a temperature of 150° C. or less.

Item 10. A method for producing a copper particle mixture comprising copper fine particle A and copper nanoparticle B, the method comprising:
(1) step 1 of preparing a solution in which copper acetate and at least one member selected from the group consisting of $C_{3-6}$ primary alcohols, $C_{3-6}$ secondary alcohols, and derivatives thereof are dissolved in $C_{2-4}$ diol;
(2) step 2 of reducing the solution with hydrazine under atmospheric pressure at 100° C. or less to prepare copper nanoparticle B in the solution; and
(3) step 3 of adding, to the solution containing the copper nanoparticle B, the copper fine particle A, and at least one dicarboxylic acid selected from the group consisting of malonic acid and oxalic acid,
wherein:
the copper fine particle A has an average particle diameter of not less than 0.1 μm and not more than 5 μm, and is coated with at least one dicarboxylic acid selected from the group consisting of malonic acid and oxalic acid;
the copper nanoparticle B comprises a central portion comprising a copper single crystal, and a protective layer surrounding the central portion, and has an average particle diameter of not less than 1 nm and less than 100 nm; and
the protective layer of the copper nanoparticle B contains at least one member selected from the group consisting of $C_{3-6}$ primary alcohols, $C_{3-6}$ secondary alcohols, and derivatives thereof.

Advantageous Effects of Invention

Since the copper particle mixture of the present invention comprises copper fine particle A and copper nanoparticle B having specific average particle diameters, it is possible to enable copper nanoparticle B to be easily dissolved between the particles of copper fine particle A, thereby forming a fine copper wire in a short period of time. Further, since copper fine particle A is coated with a specific dicarboxylic acid, it shows excellent reactivity with respect to copper nanoparticle B. Further, since copper nanoparticle B contains a specific alcohol and the like, the oxidation of copper nanoparticle B is suppressed; further, it can be easily removed, even under heating at a low temperature range. Therefore, the copper particle mixture of the present invention is capable of forming fine copper wire even by heating at a low temperature range, such as at 120° C. or less in a non-reducing atmosphere, or at 150° C. or less in a reducing atmosphere such as air. The copper particle mixture of the present invention is thus useful for a conductive copper ink material. Further, a copper particle mixture dispersion comprising the copper particle mixture, and a copper particle mixture-containing ink comprising the copper particle mixture dispersion, may also be suitably used for a conductive copper ink material.

Further, the method for sintering the copper particle mixture of the present invention is performed by using the copper particle mixture, and thus enables sintering in a low temperature range at 120° C. or less in a non-reducing atmosphere under ordinary or reduced pressure, or at 150° C. or less in a reducing atmosphere such as air under ordinary pressure. The method is thus capable of forming fine copper wire on a substrate vulnerable to heat, such as paper or plastic.

BRIEF DESCRIPTION OF DRAWINGS

FIG. 14 is a graph showing the results obtained by forming copper films by performing sintering in an inert atmosphere (nitrogen atmosphere) at a temperature of 100° C. for 60 minutes using the copper nanoparticle-containing inks prepared in Reference Examples 4 to 10, and measuring the electric resistivity of each film.

DESCRIPTION OF EMBODIMENTS

Figure 1:
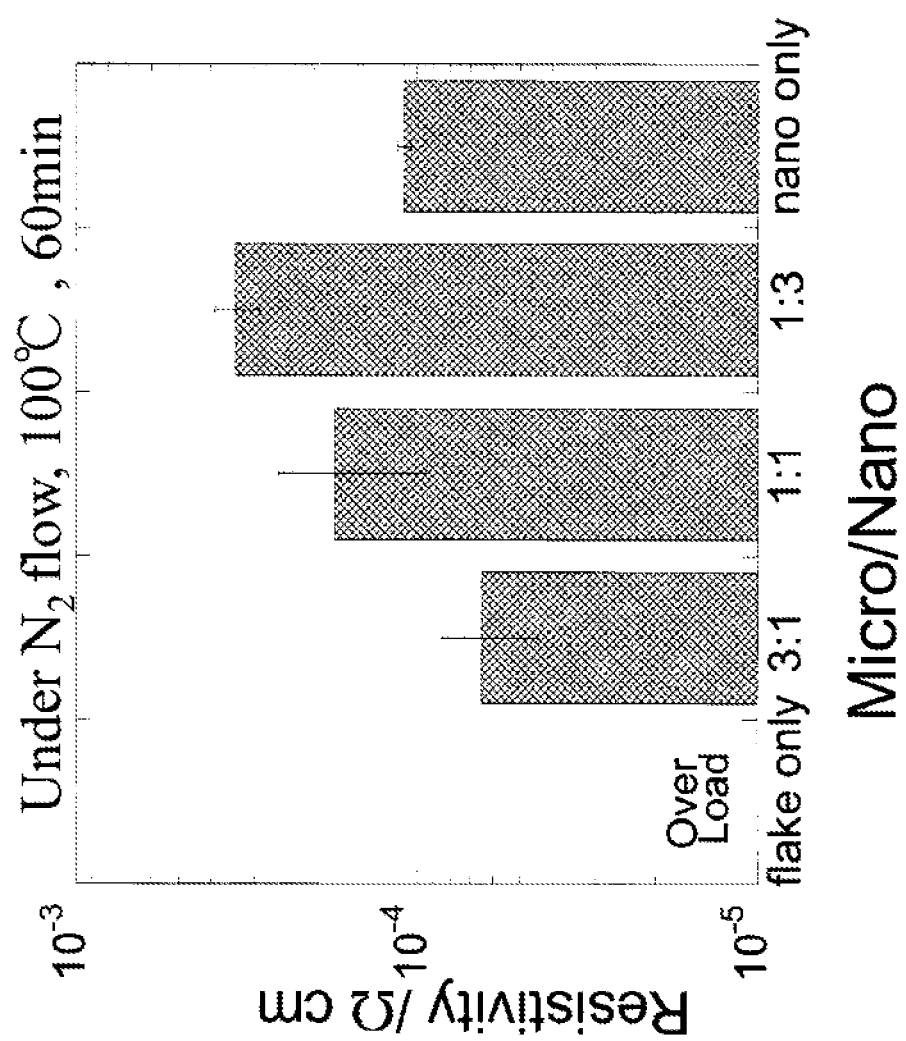
FIG. 1 is a graph showing the results of investigation of the ratio of copper fine particle A to copper nanoparticle B in the Examples.

The present invention is specifically explained below.

1. Copper Particle Mixture

The copper particle mixture of the present invention comprises copper fine particle A and copper nanoparticle B, and is structured such that copper fine particle A has an average particle diameter of not less than 0.1 μm and not more than 5 μm, and is coated with at least one dicarboxylic acid selected from the group consisting of malonic acid and oxalic acid, and copper nanoparticle B has a central portion comprising a copper single crystal, and a protective layer surrounding the central portion, and has an average particle diameter of not less than 1 nm and less than 100 nm; the protective layer of copper nanoparticle B comprising at least one member selected from the group consisting of $C_{3-6}$ primary alcohol, $C_{3-6}$ secondary alcohol, and derivatives thereof.

Copper Fine Particle A

Copper fine particle A is not particularly limited, insofar as it comprises copper particles. Copper fine particle A may comprise a copper single crystal, or may be in the form of a secondary particle resulting from aggregation of the copper primary particles.

The term "single crystal" as mentioned in the present invention means that all portions of the crystal have the same crystal orientation, and that the atoms constituting it are spatially regularly arranged. That is, this term means that, for example, in the copper fine particles of copper fine particle A when copper fine particle A is constituted of a copper single crystal, or in the copper single crystal forming the central portion of copper nanoparticle B described below, all of the particles form one crystal; no crystals growing in various directions are mixed therein; and the copper particles are not aggregated. This structure can be confirmed by the peak measurement of the copper fine particles or copper nanoparticles by XRD analysis, and direct observation of atomic arrangement using a high-resolution electron microscope.

Copper fine particle A has an average particle diameter of not less than 0.1 μm, and not more than 5 μm. If the average particle diameter of copper fine particle A is less than 0.1 μm, copper fine particle A is more easily oxidized, thereby increasing the electric resistivity of the copper film. If the average particle diameter of copper fine particle A is more than 5 μm, it is not possible to sufficiently form a copper film at a low temperature. The average particle diameter of copper fine particle A is preferably not less than 0.5 μm, more preferably not less than 0.9 μm. The average particle diameter of copper fine particle A is preferably not more than 3 μm, more preferably not more than 2 μm.

The average particle diameter of copper fine particle in this specification is an arithmetic mean value of the particle diameters of 100 randomly selected particles in a TEM observation image.

Copper fine particle A is coated with at least one dicarboxylic acid selected from the group consisting of malonic acid and oxalic acid. By using malonic acid and oxalic acid from among dicarboxylic acids, the sintering may be performed at a low temperature in a short period of time under a reducing or non-reducing atmosphere, thereby decreasing the electric resistance of the copper film. In particular, oxalic acid is preferable in terms of its effect of further decreasing the electric resistance of the copper film.

In the present invention, the expression "copper fine particle A is coated with at least one dicarboxylic acid selected from the group consisting of malonic acid and oxalic acid" means that the dicarboxylic acid is reacted with the copper on the surface of copper fine particle A, thereby causing chemisorption. This can be confirmed by measuring an infrared absorption spectrum of copper fine particle A.

Malonic acid and oxalic acid may be used individually, or as a mixture of two or more kinds.

The ratio of the mass of copper fine particle A (Ma) to the total (Ma+Mb) of the mass of copper fine particle A (Ma) and copper nanoparticle B (Mb) is preferably 25 mass % or more, more preferably 50 mass % or more, further preferably 70 mass % or more, based on 100 mass % of (Ma+Mb). Further, the ratio of the mass of copper fine particle A (Ma) is not more than 98 mass %, and more preferably not more than 80 mass %. By specifying the ratio of (Ma) within the above range, it is possible to further reduce the electric resistance of the copper film.

Copper Nanoparticle B

Copper Nanoparticle B has a central portion comprising a copper single crystal, and a protective layer surrounding the central portion.

The copper forming the central portion of copper nanoparticle B is a single crystal. Therefore, all of the particles of copper nanoparticle B form a single crystal. Since copper nanoparticle B has a specific range of average particle diameter, the sintering may be performed at a low temperature in a short period of time under a reducing or non-reducing atmosphere, thereby decreasing the electric resistance of the copper film.

Copper nanoparticle B has a protective layer formed around the central portion comprising a copper single crystal. The protective layer contains at least one member selected from the group consisting of $C_{3-6}$ primary alcohols, $C_{3-6}$ secondary alcohols, and derivatives thereof.

Examples of the $C_{3-6}$ secondary alcohol and derivatives thereof include $C_{3-6}$ secondary alcohols, and compounds in which an amino group, a carboxyl group, a hydroxyl group, etc., is added to $C_{3-6}$ secondary alcohols. Specific examples include 1-amino-2-propanol, 2-hydroxybutyric acid, 3-hydroxybutyric acid, 1,2-propanediol, 1,2-butanediol, 1,3-butanediol, and 2,3-butanediol. These secondary alcohols etc. may be used singly, or as a mixture.

The hydroxyl group of the secondary alcohol has high affinity with the solvent and the copper surface, and contributes to the improvement of dispersibility. Because the hydroxyl group of the secondary alcohol has reducing ability, the oxidation of copper is suppressed. Further, because the oxide produced during low-temperature sintering is a ketone compound, it is easily vaporized and decomposed.

The $C_{3-6}$ secondary alcohols and derivatives thereof are preferably monoalcohols. The use of monoalcohols makes it easy to adjust the boiling point or thermal decomposition temperature of the protective layer to 150° C. or less.

The $C_{3-6}$ secondary alcohols and derivatives thereof preferably have a group represented by the following formula (1). In the following formulas (1) to (5), the asterisk (*) represents a bonding hand.

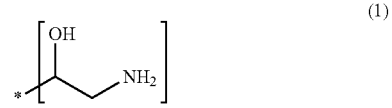

(1)

The group represented by formula (1) is oxidized to a ketone, and produces a group represented by the following formula (3).

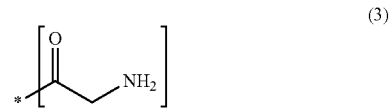

(3)

The groups represented by formulas (1) and (3) above have high coordination power, and each forms a 5-membered ring together with the copper atom on the surface of the central portion comprising a copper single crystal to become a group having a metallacycle structure represented by the following formula (4) or (5), which is stabilized. Accordingly, the aggregation of the copper nanoparticles is suppressed to a greater extent.

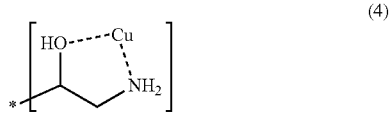

(4)

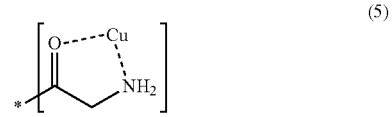

(5)

Examples of the $C_{3-6}$ primary alcohols and derivatives thereof include $C_{3-6}$ primary alcohols; and compounds in which an amino group, a carboxyl group, a hydroxyl group, etc., is added to $C_{3-6}$ primary alcohols. Specific examples include 2-amino-2-ethyl-1,3-propanediol and 2-amino-1-butanol. These primary alcohols etc. may be used singly, or as a mixture thereof.

The $C_{3-6}$ primary alcohols and derivatives thereof are preferably monoalcohols. The use of monoalcohols makes it easy to adjust the boiling point or thermal decomposition temperature of the protective layer to 150° C. or less.

The $C_{3-6}$ primary alcohols and derivatives thereof preferably have a group represented by the following formula (2).

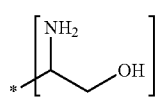

(2)

The group represented by formula (2) also forms a 5-membered ring together with the copper atom on the surface of the central portion comprising a copper single crystal to become a group having a metallacycle structure, which is stabilized. Accordingly, the aggregation of the copper nanoparticles is suppressed to a greater extent.

Among the above $C_{3-6}$ primary and/or secondary alcohols, etc., 1-amino-2-propanol is preferred. 1-amino-2-propanol satisfies the following conditions, which are preferable for a protective agent for copper nanoparticles that can be sintered at a low temperature. The conditions are such that 1-amino-2-propanol can increase the dispersibility of the copper nanoparticles, suppress the oxidation of the copper nanoparticles, and is decomposed or vaporized (evaporated) at a low temperature of 150° C. or less while suppressing the oxidation of copper in the process of sintering during the production. Therefore, the boiling point or thermal decomposition temperature of the protective layer is preferably 150° C. or less. The thermal decomposition temperature of the protective layer mentioned here refers to a temperature at which the substance that constitutes the protective layer is desorbed by heat from the central portion comprising a copper single crystal. Desorption of the substance mentioned here includes a case in which the substance constituting the protective layer is evaporated by heat. When copper nanoparticles are produced using the 1-amino-2-propanol mentioned above, the amino group in the structure coordinates with copper ions to form a complex, and the hydroxyl group increases the solubility in $C_{2-4}$ diols, such as ethylene glycol. Consequently, monodisperse copper nanoparticles having an average particle diameter of 6 nm or less can be synthesized, in spite of the high copper ion concentration (e.g., 1,000 mM in terms of copper ions). Further, the hydroxyl group of 1-amino-2-propanol improves oxidation resistance; and, due to the volatility of 1-amino-2-propanol, it can be removed by decomposition and evaporation by heating at a low temperature of 150° C. or less, and can suppress the oxidation of copper due to low-temperature heating. For example, taking advantage of the volatility of 1-amino-2-propanol, the protective layer comprising 1-amino-2-propanol can be removed at 80° C. (under reduced pressure), and the copper nanoparticles can be sintered at a low temperature. This also enables sintering of a copper particle mixture at a low temperature. When the protective layer comprises octylamine etc., which is used as a general amine for the synthesis of copper nanoparticles, the produced copper nanoparticles are aggregated during the production to form bulk copper, thereby failing to obtain copper nanoparticles.

The boiling point or thermal decomposition temperature of the protective layer of the copper nanoparticles can be measured by conducting thermal analysis by TG-DTA in a nitrogen atmosphere by using a dry powder of the copper nanoparticles.

The protective layer may contain components other than at least one member selected from the group consisting of the $C_{3-6}$ primary alcohols, $C_{3-6}$ secondary alcohols, and derivatives thereof mentioned above; however, it is preferable that the protective layer consists of at least one member selected from the group consisting of $C_{3-6}$ primary alcohols, $C_{3-6}$ secondary alcohols, and derivatives thereof, in terms of facilitating low-temperature sintering of the copper nanoparticles.

The mass ratio of the protective layer in copper nanoparticle B is preferably 10 to 30 mass %, based on 100 mass % of the copper nanoparticle. When the mass ratio of the protective layer falls within the above range, the protective layer may be more easily removed by heating at a low temperature of 150° C. or less during sintering of the copper particle mixture.

The average particle diameter of copper nanoparticle B is not less than 1 nm, and less than 100 nm. If the average particle diameter of copper nanoparticle B is less than 1 nm, the aggregation of copper nanoparticle B cannot be suppressed. Further, when the average particle diameter of copper nanoparticle B exceeds 100 nm, the sintering cannot be performed at a low temperature in a short period of time in a reducing or non-reducing atmosphere. Consequently, it is not possible to decrease the electric resistance of the copper film. The average particle diameter of copper nanoparticle B is preferably not less than 1.5 nm, more preferably not less than 2 nm. Further, the average particle diameter of the copper fine particles is preferably not more than 50 nm, more preferably not more than 10 nm, and further preferably not more than 5 μm.

The average particle diameter of the copper nanoparticle in the present specification is an arithmetic mean value of the particle diameter of 100 randomly selected particles in a TEM observation image.

In copper nanoparticle B, the standard deviation based on particle size distribution is preferably 20% or less of the average particle diameter of the copper nanoparticles. That is, it is preferable that the value obtained by dividing the standard deviation based on particle size distribution of the copper nanoparticles by the average particle diameter of the copper nanoparticles, and expressing the resulting value as a percentage, be 20% or less. Due to the standard deviation based on particle size distribution of the copper nanoparticles within the above range, the average particle diameter of copper nanoparticles is made uniform, and the resulting copper nanoparticles are suitable for sintering at a low temperature.

The ratio of the mass of copper nanoparticle B (Mb) to the total (Ma+Mb) of the mass of copper fine particle A (Ma) and the mass of copper nanoparticle B (Mb) is preferably 2 mass % or more, more preferably 20 mass % or more, based on 100 mass % of (Ma+Mb). Further, the ratio of copper nanoparticle B (Mb) is preferably not more than 75 mass %, more preferably not more than 50 mass %, and further preferably not more than 30 mass %. By specifying the ratio of (Mb) within the above range, it is possible to further reduce the electric resistance of the copper film.

2. Method for Producing Copper Particle Mixture

The method for producing a copper particle mixture of the present invention is a method for producing a copper particle mixture comprising copper fine particle A and copper nanoparticle B, the method comprising:

(1) step 1 of preparing a solution in which copper acetate and at least one member selected from the group consisting of, $C_{3-6}$ primary alcohols, $C_{3-6}$ secondary alcohols, and derivatives thereof are dissolved in $C_{2-4}$ diol;

(2) step 2 of reducing the solution with hydrazine under atmospheric pressure at 100° C. or less to prepare copper nanoparticle B in the solution; and (3) step 3 of adding, to the solution containing copper nanoparticle B, copper fine particle A and at least one dicarboxylic acid selected from the group consisting of malonic acid and oxalic acid, wherein the copper fine particle A has an average particle diameter of not less than 0.1 μm and not more than 5 μm, and is coated with at least one dicarboxylic acid selected from the group consisting of malonic acid and oxalic acid;

the copper nanoparticle B comprises a central portion comprising a copper single crystal, and a protective layer surrounding the central portion, and has an average particle diameter of not less than 1 nm and less than 100 nm; and the protective layer of copper nanoparticle B contains at least one member selected from the group consisting of $C_{3-6}$ primary alcohols, $C_{3-6}$ secondary alcohols, and derivatives thereof. The copper particle mixture of the present invention described above may be produced by the production method of the present invention comprising steps 1 to 3 shown above.

Step 1

Step 1 is to prepare a solution in which copper acetate and at least one member selected from the group consisting of $C_{3-6}$ primary alcohols, $C_{3-6}$ secondary alcohols, and derivatives thereof are dissolved in a $C_{2-4}$ diol.

The copper compound used in step 1 is copper acetate [Cu(acac)$_2$]. In consideration of use as a conductive material, the copper compound used in step 1 is preferably copper ions that are dissolved in a $C_{2-4}$ diol and do not contain halogen. If copper acetate is used as the copper compound used in step 1, copper ions are easily reduced, and highly dispersible copper nanoparticles having an average particle diameter of 10 nm or less, particularly 3 to 6 nm, are easily obtained. In contrast, for example, when copper formate [Cu(HCOO)$_2$] is used as the copper compound used in step 1, aggregation is promoted by formic acid, which is a strong acid ion, and aggregates of coarse copper particles are formed.

In step 1, the content of copper acetate in the solution is not particularly limited; however, the amount in terms of copper ions is preferably about 5 to 1,000 mM, more preferably about 100 to 400 mM, and even more preferably about 200 to 300 mM. If the copper acetate content of the solution is too low, copper nanoparticles may be difficult to obtain. If the copper acetate content of the solution is too high, the copper nanoparticles produced may be aggregated, and bulk copper may be precipitated.

In step 1, at least one member selected from the group consisting of $C_{3-6}$ primary and/or secondary alcohols, and derivatives thereof is used. Due to the use of such $C_{3-6}$ primary and/or secondary alcohols, etc., a protective layer comprising the $C_{3-6}$ primary and/or secondary alcohols, etc., can be formed around the central portion comprising a copper single crystal. The protective layer can be decomposed or vaporized (evaporated) at a low temperature of 150° C. or less.

Usable $C_{3-6}$ primary and/or secondary alcohols, etc., are the same as those mentioned above for forming the protective layer of the copper nanoparticles.

In step 1, the concentration of the $C_{3-6}$ primary and/or secondary alcohols, etc., in the solution is preferably 3 to 20 times, more preferably 3 to 10 times, higher than the concentration of copper ions in the solution. If the concentration of the $C_{3-6}$ primary and/or secondary alcohols, etc., in the solution is too low, the protective layer may not be sufficiently formed. Further, the resulting copper nanoparticles may have a large average particle diameter. If the concentration of the $C_{3-6}$ primary and/or secondary alcohols, etc., in the solution is too high, the presence of excessive secondary alcohols, etc., may make it difficult to separate and purify copper nanoparticles.

In step 1, a $C_{2-4}$ diol is used as the solvent for preparing the solution. When a $C_{2-4}$ diol is used as the solvent, copper acetate and $C_{3-6}$ primary and/or secondary alcohols, etc., can be dissolved, and the aggregation and oxidation of copper nanoparticles to be obtained can be suppressed. Examples of the $C_{2-4}$ diol include ethylene glycol and propylene glycol. Among these, ethylene glycol is preferable in terms of the excellent dispersibility of copper nanoparticles to be obtained.

The $C_{2-4}$ diol used as the solvent may be the same as those used as the primary and/or secondary alcohols, etc., forming the protective layer. Due to the use of the same $C_{2-4}$ diol as the primary and/or secondary alcohols, etc., forming the protective layer as the solvent, a part of the solvent forms the protective layer of the copper nanoparticles; thus, there is no need to separately add primary and/or secondary alcohols, etc., for forming the protective layer, in addition to the solvent. Accordingly, copper nanoparticles can be easily produced. Examples of the same $C_{2-4}$ diol as the primary and/or secondary alcohols, etc., forming the protective layer include 1,2-propanediol.

As the solvent used in step 1, a $C_{2-4}$ diol may be used alone; however, another polar solvent (e.g., dimethylformamide, N-methylpyrrolidone, or ethylene glycol monomethyl ether) may be used in combination. When two or more solvents are mixed, the content of $C_{2-4}$ diol in the solvent mixture is preferably 60 wt. % or more, and more preferably 90 wt. % or more.

The above solution may contain other additives in addition to copper acetate, $C_{3-6}$ primary and/or secondary alcohols etc., and a $C_{2-4}$ diol. Examples of other additives include an ethanol solution of ammonia. The ammonia content of the ethanol solution is preferably 1 to 5 vol %, based on 100 vol % of the ethanol solution.

By step 1 described above, a solution in which copper acetate and $C_{3-6}$ primary and/or secondary alcohols etc. are dissolved in a $C_{2-4}$ diol is prepared.

Step 2

Step 2 is to reduce the solution prepared by step 1 with hydrazine under atmospheric pressure at 100° C. or less, thereby preparing copper nanoparticle B in the solution. Examples of a reducing agent used in the hydrazine reduction include hydrazine compounds. Among them, hydrazine, hydrazine sulfate, and phenylhydrazine can be suitably used. On the other hand, sodium boron hydride is known as a reducing agent used in the synthesis of metal nanoparticles having an average particle diameter of 6 nm or less. If sodium boron hydride is used as the reducing agent in step 2, the produced copper nanoparticles are aggregated, and bulk copper is precipitated.

The concentration of the hydrazine compound in the solution in step 2 is preferably 5 to 30 times, and more preferably 15 to 30 times, higher than the concentration of copper ions in the solution. If the concentration of the hydrazine compound in the solution is too low, the ability to reduce the copper nanoparticles may be insufficient, and the average particle diameter of the copper nanoparticles may be larger. If the concentration of the hydrazine compound in the solution is too high, the amount of hydrazine compound may be excessive, thereby making it difficult to separate and purify the copper nanoparticles.

In step 2, hydrazine reduction is carried out under atmospheric pressure. In step 1, a solution in which copper acetate and $C_{3-6}$ primary and/or secondary alcohols, etc., are dissolved in a $C_{2-4}$ diol is prepared, and the resulting solution is reduced with hydrazine in step 2. Thus, step 2 can be performed under atmospheric pressure. Therefore, according to the above production method, which does not require pressurization in the production process, copper nanoparticle B can be easily produced.

In step 2, hydrazine reduction is carried out at 100° C. or less. Specifically, step 2 may be performed after the temperature of the solution prepared in step 1 is adjusted to 100° C. or less. The temperature of hydrazine reduction is 100° C. or less, and preferably 50° C. or less. If the temperature of hydrazine reduction is too high, by-products may be produced. Moreover, in step 2, the temperature of hydrazine reduction is preferably 5° C. or more, and more preferably 20° C. or more. If the temperature of hydrazine reduction is too low, copper nanoparticles may not be sufficiently produced.

By step 2 described above, the solution prepared in step 1 is reduced with hydrazine under atmospheric pressure.

With steps 1 and 2 explained above, copper nanoparticle B having a central portion comprising a copper single crystal, and a protective layer surrounding the central portion, can be prepared. With steps 1 and 2 explained above, copper nanoparticle B having a small average particle diameter, namely, as small as not less than 1 nm and less than 100 nm, preferably not more than 10 nm, more preferably about 3 to 6 nm, may be obtained. Moreover, since the protective layer contains $C_{3-6}$ primary and/or secondary alcohols, etc., and is therefore volatile, and since the boiling point or thermal decomposition temperature of the protective layer is set to 150° C. or less, the protective layer can be removed by heating at 150° C. or less, and the copper particle mixture containing copper nanoparticle B can be sintered at a low temperature of 150° C. or less. Furthermore, in step 2, copper nanoparticle B may be obtained in a state in which the particles thereof are uniformly dispersed in the solution. Therefore, the solution in which the obtained copper nanoparticles B are dispersed can be used in step 3.

Step 3

Step 3 is a step of adding, to the solution containing copper nanoparticle B, copper fine particle A and at least one dicarboxylic acid selected from the group consisting of malonic acid and oxalic acid.

The solution prepared in step 2 may be used as the solution containing copper nanoparticle B.

As copper fine particle A to be added to the solution, the same copper fine particle A as that in the copper particle mixture, i.e., copper fine particle A having an average particle diameter of not less than 0.1 μm and not more than 5 μm, may be used.

The amount of copper fine particle A to be added to the solution is not particularly limited, and may be appropriately adjusted according to the amount of copper nanoparticle B in the solution. The ratio of the mass of copper fine particle A (Ma) to the total (Ma+Mb) of the mass of copper fine particle A (Ma) and copper nanoparticle B (Mb) in the solution is preferably 25 mass % or more, more preferably 50 mass % or more, further preferably 70 mass % or more, based on 100 mass % of (Ma+Mb). Further, the ratio of the mass of copper fine particle A (Ma) is preferably not more than 98 mass %, and more preferably not more than 80 mass %. By specifying the ratio of (Ma) within the above range, it is possible to further reduce the electric resistance of the copper film formed by using the obtained copper particle mixture.

At least one dicarboxylic acid selected from the group consisting of malonic acid and oxalic acid is added to the solution. With the addition, copper fine particle A is coated with the dicarboxylic acid. By using malonic acid and oxalic acid from among various dicarboxylic acids, the sintering of the obtained copper particle mixture may be performed at a low temperature in a short period of time under a reducing or non-reducing atmosphere, thereby decreasing the electric resistance of the copper film. In particular, oxalic acid is preferable in terms of its effect of further decreasing the electric resistance of the copper film.

Malonic acid and oxalic acid may be used individually, or as a mixture of two or more kinds.

The amount of the dicarboxylic acid to be added is not particularly limited. The amount is preferably 0.1 to 5 mass %, more preferably 0.5 to 2 mass %, based on 100 mass % of the solution. By specifying the addition amount of the dicarboxylic acid within the above range, the sintering of the obtained copper particle mixture may be performed at a low temperature in a shorter time under a reducing or non-reducing atmosphere, thereby decreasing the electric resistance of the copper film.

According to the above production method, a copper particle mixture is obtained in a state in which they are dispersed in the solution. The production method may further comprise, after step 3, a step of precipitating the copper particle mixture in the solution. Because the production method comprises this step, the precipitated copper particle mixture can be collected and used. The method for precipitating the copper particle mixture in the solution is not particularly limited, and a conventionally known method, such as precipitation by centrifugation, can be used.

Another example of the method for precipitating the copper particle mixture in the solution is a method for adding a precipitation solvent to the above solution, to thereby precipitate the copper particle mixture. The precipitation solvent is not particularly limited, as long as it can precipitate the copper particle mixture. Examples thereof include dimethylacetamide (DMA), N-methylpyrrolidone (NMP), and the like. The use of such a precipitation solvent enables the precipitation of the copper particle mixture in the solution, and the dissolution of hydrazine and $C_{3-6}$ primary and/or secondary alcohols, etc., which are impurities in the solution; therefore, the copper particle mixture can be easily separated from the hydrazine and the $C_{3-6}$ primary and/or secondary alcohols, etc.

As the step of precipitating the copper particle mixture in the above solution, the method for adding a precipitation solvent to the solution to thereby precipitate the copper particle mixture may be followed by a method for precipitating the copper particle mixture by centrifugation. When the copper particle mixture in the solution is precipitated in the above manner, the copper particle mixture can be more efficiently precipitated, and the copper particle mixture can be easily separated.

The above production method may further comprise a step of washing the precipitated copper particle mixture with a volatile solvent. Because the production method comprises this step, hydrazine and excess $C_{3-6}$ primary and/or secondary alcohols, etc., other than the protective layer, can be removed from the surface of the copper particle mixture, and high-purity copper particle mixture can be obtained. The volatile solvent can be acetone; however, dimethylacetamide or N-methylpyrrolidone is preferred, because they can suppress the oxidation of the copper particle mixture.

3. Copper Particle Mixture Dispersion

The copper particle mixture of the present invention can be dispersed in a dispersion medium to thereby form a copper particle mixture dispersion (paste) in which the copper particle mixture is redispersed as colloids. Such a copper particle mixture dispersion is also one of the present inventions.

Examples of the dispersion medium include polar solvents, such as alcohols (e.g., methanol, ethanol, propylene glycol, and glycerol), toluene, alkanolamine, and N,N-dimethylformamide. These dispersion media may be used singly, or as a mixture of two or more. For example, propylene glycol and glycerol may be used by mixing them at a volume ratio of 1:1. Among these, it is preferable to use alkanolamine, and more preferable to use $C_{3-6}$ alkanolamine, which has the same number of carbon atoms as the $C_{3-6}$ primary and/or secondary alcohols, etc., forming the protective layer of copper nanoparticle B, because it can maintain high dispersion stability. These dispersion media can be suitably selected, depending on, for example, the printing method whereby the copper particle mixture is applied, the desired viscosity, and the type of copper circuit to be formed.

The total (Ma+Mb) of the mass of the copper nanoparticles (Ma) and the mass of the copper fine particles (Mb) in the copper nanoparticle dispersion is preferably 10 to 80 mass %, and more preferably 30 to 50 mass %, based on 100 mass % of the copper nanoparticle dispersion.

4. Copper Particle Mixture-Containing Ink

The copper particle mixture dispersion is used by being incorporated into copper particle mixture-containing ink. The copper particle mixture-containing ink comprising the copper particle mixture dispersion is also one of the present inventions.

Further, the copper particle mixture can be easily dispersed in a dispersion medium by removing the supernatant alkane solvent and the solution in a preservation state in which the $C_{4-14}$ alkane solvent covers the liquid surface of the solution in which the copper particle mixture is precipitated in the bottom, and adding the dispersion medium to the remaining copper particle mixture. Accordingly, the copper particle mixture preserved by the method for preserving the copper particle mixture described above can be easily formed into a copper particle mixture dispersion and copper particle mixture-containing ink.

In the copper particle mixture dispersion and copper particle mixture-containing ink, it is not essential to completely remove the solvent or amine; a dispersion medium may be added while they are left to reach an optimal concentration, depending on the use. Further, the copper particle mixture-containing ink may suitably contain terpineol, dodecanol, ethylene glycol, 1-methoxy-2-propanol, etc., depending on the use.

The content of the metal copper in the copper particle mixture-containing ink is preferably not less than 5 mass % and less than 80 mass %, and more preferably not less than 10 mass % and less than 70 mass %. By ensuring the content of the metal copper of 5 mass % or more, the copper particle mixture-containing ink may be further suitably used as a conductive paste. On the other hand, if the content of the metal copper is less than 80 mass %, the viscosity of the copper particle mixture-containing ink is further reduced, thus improving the handling of the ink.

5. Method for Sintering Copper Particle Mixture

With the structure described above, the copper particle mixture of the present invention is capable of forming fine copper wire in a short period of time even by heating at a low temperature range, such as at 120° C. or less in a non-reducing atmosphere, or at 150° C. or less in a reducing atmosphere such as air. Such a method for sintering a copper particle mixture comprising sintering a copper particle mixture at a temperature of 120° C. or less in a non-reducing atmosphere under ordinary or reduced pressure is one of the present inventions. Further, a method for sintering a copper particle mixture comprising sintering a copper particle mixture at a temperature of 150° C. or less in the air under ordinary pressure is also one of the present inventions.

When the copper particle mixture is sintered in a non-reducing atmosphere, the sintering temperature is not more than 120° C., preferably not more than 100° C. The sintering temperature is preferably not less than 70° C., more preferably not less than 80° C.

When the copper particle mixture is sintered in a non-reducing atmosphere, the sintering may be performed under ordinary pressure, or under reduced pressure. The pressure upon the sintering under reduced pressure is not particularly limited, and any pressure lower than the ordinary pressure may be used.

The non-reducing atmosphere is not particularly limited. Examples include nitrogen, argon, and the like.

When the copper particle mixture is sintered in the air, the sintering temperature is not more than 150° C., preferably not more than 140° C. The sintering temperature is preferably not less than 100° C., more preferably not less than 120° C.

When the copper particle mixture is sintered in the air, the sintering is performed under ordinary pressure.

The copper particle mixture and the copper particle mixture dispersion of the present invention can be preferably used as an ink material for forming a fine metal wire; however, the copper particle mixture and the copper particle mixture dispersion of the present invention are not limited to such applications. The copper particle mixture and the copper particle mixture dispersion of the present invention can be used as a catalyst material (a catalyst or a catalyst support), and can also be used as a transparent conductive film or an antireflection coating material, which can be an alternative to ITO.

EXAMPLES

The present invention is specifically described below with reference to Examples and Comparative Examples. However, the present invention is not limited to the Examples.

The devices and samples used in the Examples and Comparative Examples are as follows.

Transmission Electron Microscope (TEM)

The measurement was carried out using a JEOL JEM-2010F. The sample used was an ethanol dispersion of copper nanoparticles obtained by operation 2 described later.

Infrared Spectroscopy (IR) Measurement

The measurement was carried out using a JASCO FT/IR-4200.

Electric Resistance Measurement by Four-Probe Method

The sheet resistance of the sintered copper film was measured using a Loresta-EP resistivity meter (Loresta-EP MCP-T360), and four probes (MCP-TPQPP).

Powder X-Ray Diffraction (XRD) Measurement

The measurement was carried out using a Bruker D2 PHASER.

Scanning Electron Microscope (SEM)

The measurement was carried out using a JEOL FE-SEM, model JSM-6700, at 5 keV.

Example 1

Preparation of Copper Nanoparticle B

Ethylene glycol (30 mL) was placed in a 110 mL screw tube, and 1-amino-2-propanol (11.6 mL) and copper acetate (II) anhydride (2.73 g) were added thereto. They were dissolved by a ultrasonic treatment, thereby preparing a copper complex solution. Subsequently, a football-shaped stirrer (25×φ10 mm) was placed in the screw tube, and the solution was stirred at about 1000 rpm using a magnetic stirrer. Then, 7.3 mL of hydrazine monohydrate was added as a reducing agent, thereby preparing a solution. The solution was stirred for 24 hours, thereby obtaining a slightly reddish dark brown solution in which copper nanoparticles are dispersed.

In the above reaction, the raw material solution was stirred at a stirring speed as quick as 1000 rpm; therefore, monodisperse-sized copper nanoparticles were easily produced due to the progress of the uniform reduction reaction, and the aggregation of the produced particles was easily suppressed.

The separation of the copper nanoparticles from the solution in which the copper nanoparticles were dispersed was performed by the following operations.

In a 50 mL centrifuge tube, 25 mL of dimethylacetamide (DMA) was mixed with 12.5 mL of the solution obtained in Example 1 in which copper nanoparticles were dispersed, so that the volume ratio of the solution in which copper nanoparticles were dispersed and DMA was 1:2. As a result, the copper nanoparticles were aggregated, and the solution was suspended. To further promote the aggregation, the centrifuge tube was lightly shaken, and allowed to stand for several minutes to be exposed to air. The suspended solution was centrifuged at 6000 rpm for 3 minutes, thereby obtaining a solution in which a precipitate of the copper nanoparticles was settled. After the solution was removed, the precipitate of the copper nanoparticles was collected.

7 mL of DMA was added to the precipitate, and a dispersion treatment was performed using vortex, followed by washing. Subsequently, centrifugation was performed for 4 minutes at 6000 rpm. The supernatant was removed, and 25 mL of toluene was added to the precipitate, followed by washing using ultrasonic waves and vortex. Subsequently, centrifugation was performed for 1 minute at 6000 rpm. The supernatant was removed, and 25 mL of hexane was added to the precipitate, followed by washing by a dispersion treatment using ultrasonic waves and vortex. Subsequently, centrifugation was performed for 5 minutes at 6000 rpm, thereby removing the supernatant. Finally, to further remove the hexane incorporated in the precipitated copper nanoparticles, 10-minute centrifugation at 6000 rpm was performed three times in total. With these operations, copper nanoparticle B containing less waste, including excessive protective agent or reducing agent generated upon synthesis, was prepared. The average particle diameter of copper nanoparticle B determined by finding an arithmetic mean value of the particle diameters of 100 randomly selected particles in a TEM observation image was 3 nm.

Preparation of Copper Particle Mixture

Copper fine particles having an average particle diameter of 3 μm (MA-CO25KP: flake-form copper microparticles, Mitsui Mining & Smelting Co., Ltd.) were prepared as copper fine particle A. The copper fine particle A thus prepared and the copper nanoparticle B prepared as described above were placed in a PFA vessel container so that their mass ratio was 3:1. Oxalic acid was added to the PFA vessel container. Propylene glycol and glycerol were mixed at a volume ratio of 3:1, and 800 μL of the resulting mixture was added to prepare a solution in which the copper particle mixture was dispersed. The amount of oxalic acid added was 1 mass %, based on 100 mass % of the prepared solution. The content of the metal copper in the prepared solution was 60 mass %.

The separation and purification of the copper particle mixture from the solution in which the copper particle mixture was dispersed, and the preservation of the collected copper particle mixture, were performed by the following operations.

Operation

A ball mill treatment was performed so as to remove hexane as a washing solvent, which could not be removed as a supernatant, from the thus-obtained solution in which the copper particle mixture was dispersed. The ball mill treatment was performed by adding seven stainless-steel balls (diameter: 5 mm) to the container, and providing vibration for about 60 minutes using a shaking stirrer. For about 5 minutes at the beginning, the separated supernatant of hexane was removed as necessary. During the remaining 55 minutes, the lid of the container was left lightly open so that the hexane that had been separated was volatilized and evaporated. Then, the solution was transferred from the PFA vessel container to an ointment pot (6 mL), and a defoaming treatment and a kneading treatment were performed individually for 5 minutes using a rotating and revolving mixer to uniformly disperse the contents of the ink, thereby preparing a copper particle mixture-containing ink as a copper particle mixture dispersion. The copper particle mixture-containing ink thus prepared was stored in a freezer at −30° C.

Examples 2 and 3, and Comparative Examples 1 and 2

Example 2

A copper particle mixture was prepared in the same manner as in Example 1, except that copper fine particle A and copper nanoparticle B were used at a mass ratio of 1:1, thereby preparing a copper particle mixture-containing ink as a copper particle mixture dispersion.

Example 3

A copper particle mixture was prepared in the same manner as in Example 1, except that copper fine particle A and copper nanoparticle B were used at a mass ratio of 1:3, thereby preparing a copper particle mixture-containing ink as a copper particle mixture dispersion.

Comparative Example 1

A copper fine particle-containing ink as a copper fine particle dispersion was prepared in the same manner as in Example 1, except that only copper fine particle A was used and copper nanoparticle B was not used. The ink was prepared by adjusting the copper concentration so that the content of the metal copper was about 60 mass % in concordance with the concentration of the copper particle mixture-containing ink at 3:1 of Example 1.

Comparative Example 2

Copper nanoparticles were prepared in the same manner as in Example 1, except that only copper nanoparticle B was used and copper fine particle A was not used, and a copper nanoparticle-containing ink as a copper nanoparticle dispersion was prepared.

Investigation of Ratio of Copper Fine Particle A to Copper Nanoparticle B

Copper films were formed by using the copper particle mixture-containing inks prepared in Examples 1 to 3, the copper fine particle-containing ink prepared in Comparative Example 1, and the copper nanoparticle-containing ink prepared in Comparative Example 2; and measuring the electric resistivity of each film. More specifically, the prepared copper nanoink was applied to a polyimide substrate using a doctor blade (12 µm) to form a film. The sintering was performed using an electric furnace with a temperature increase rate of 5° C./min under a nitrogen flow (1 NL/min), and maintaining at 100° C. for 60 min. The sheet resistance ($\Omega/\square$) of the thermally sintered copper film thus obtained was measured using a four-probe method. The film thickness was measured with a micrometer, and volume resistivity ($\Omega$ cm) was calculated according to the product with the sheet resistance. FIG. 1 shows the results.

As shown in FIG. 1, the copper film of Comparative Example 1 formed by sintering the copper fine particle-containing ink exhibited no conductivity (flake only). This is considered to be due to the melting point of copper fine particle A, which is more than 100° C., with which the sintering did not proceed. The electric resistivity of the copper films obtained by sintering the copper particle mixture-containing inks of Examples 1 to 3 was $6.5\pm2.0\times10^{-5}$ $\Omega$ cm (Example 1), $1.7\pm0.8\times10^{-4}$ $\Omega$ cm (Example 2), and $3.4\pm0.5\times10^{-4}$ $\Omega$ cm (Example 3), respectively. The value was smallest when the mass ratio of copper fine particle A and copper nanoparticle B was 3:1 (Example 1). In Example 2 (1:1) and Example 3 (1:3), the electric resistivity values of the copper films formed by sintering the copper nanoink were higher than that in Comparative Example 2 (nano only). The low electric resistivity of the copper film formed by sintering the copper particle mixture-containing ink of Example 1 (3:1) is considered to be due to the high filling rate.

Investigation of Sintering Temperature: 1

Figure 2:
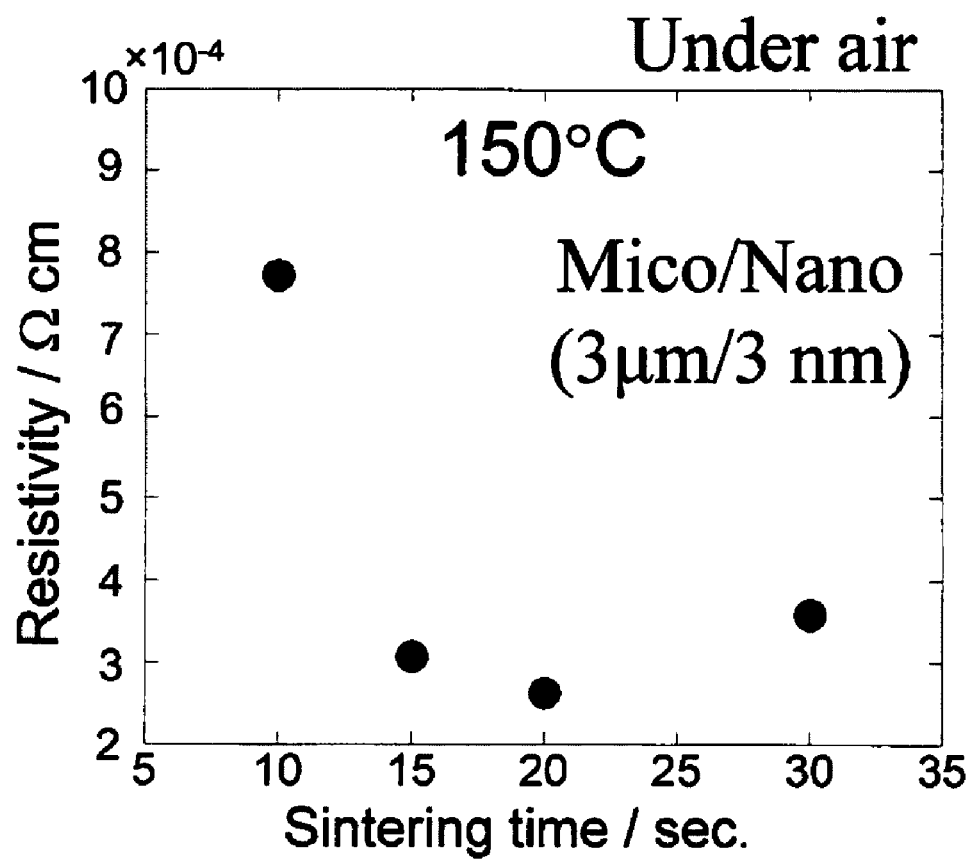
FIG. 2 is a graph showing the results obtained by forming copper films by sintering in the air at a temperature of 150° C. for 10 seconds, 15 seconds, 20 seconds, or 30 seconds using the copper particle mixture-containing ink prepared in Example 1, and measuring the electric resistivity of each film.
Figure 3:
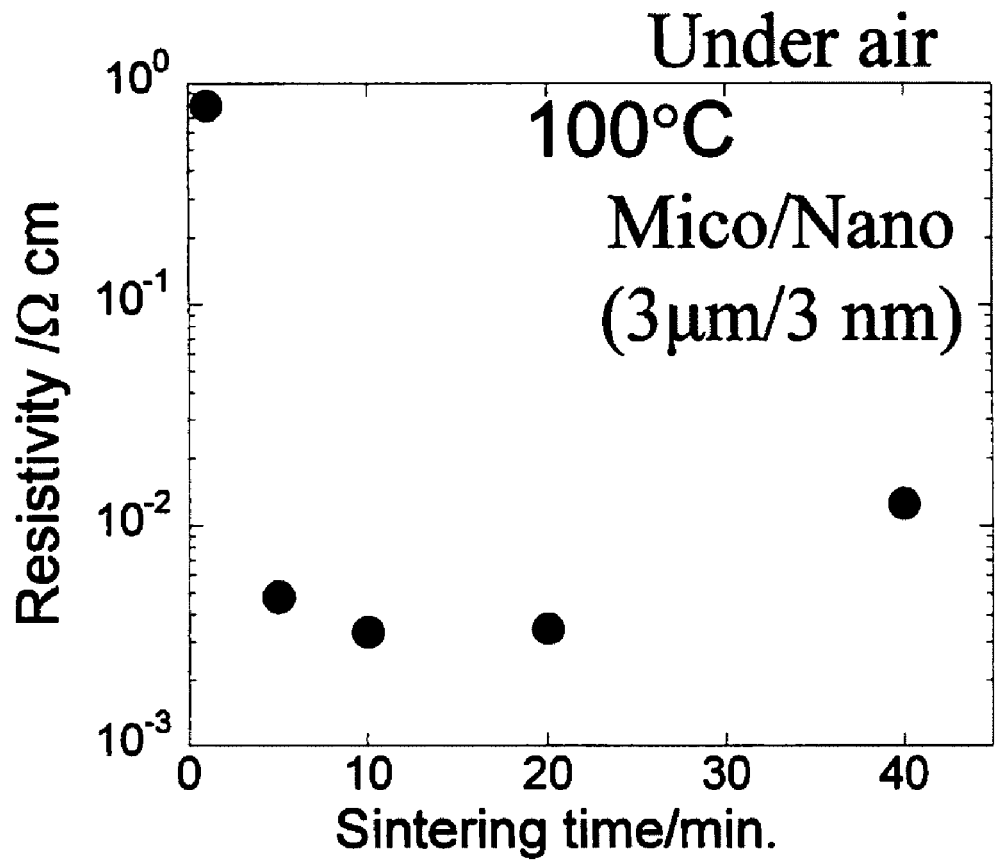
FIG. 3 is a graph showing the results obtained by forming copper films by sintering in the air at a temperature of 100° C. for 1 minute, 5 minutes, 10 minutes, 20 minutes, 30 minutes, or 40 minutes using the copper particle mixture-containing ink prepared in Example 1, and measuring the electric resistivity of each film.
Figure 4:
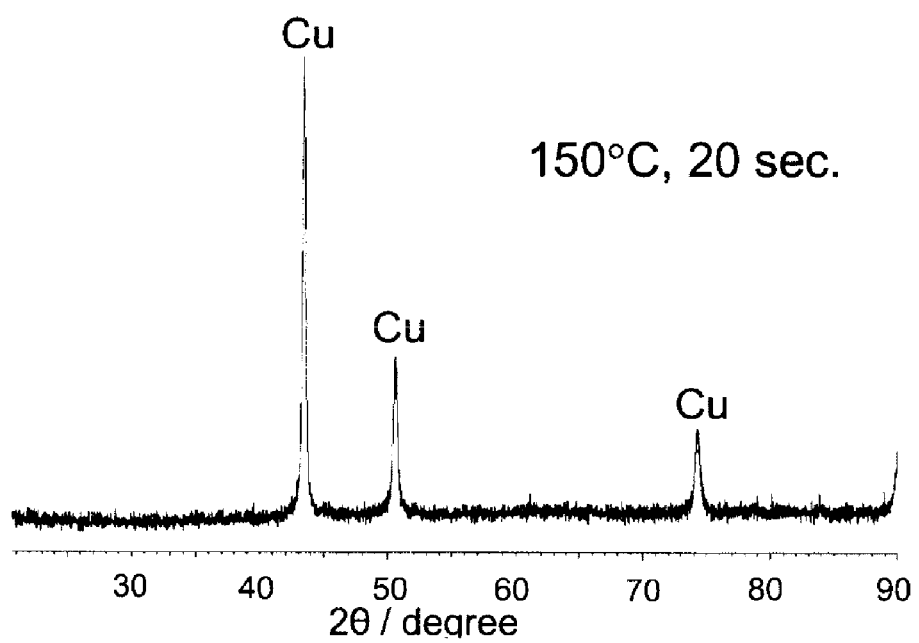
FIG. 4 is a graph showing the results of XRD measurement of a copper film formed by sintering at a temperature of 150° C. for 20 seconds using the copper particle mixture-containing ink prepared in Example 1.

Copper films were formed from the copper particle mixture-containing ink prepared in Example 1 by performing sintering in the air at a sintering temperature of 150° C. for 10 seconds, 15 seconds, 20 seconds, or 30 seconds, and the electric resistivity of each film was measured (FIG. 2). Further, copper films were formed by performing sintering in the air at a sintering temperature of 100° C. for 1 minute, 5 minutes, 10 minutes, 20 minutes, 30 minutes, or 40 minutes, and the electric resistivity of each film was measured (FIG. 3). The sintering was performed by heating polyimide on which the copper particle mixture-containing ink was applied for a predetermined time in the air. An XRD measurement was performed on a copper film formed by heating at 150° C. for 20 seconds (FIG. 4). FIGS. 2 to 4 show the results.

In FIG. 2, the electric resistance was 10 seconds ($1.1\pm0.8\times10^{0}\Omega/\square$), 15 seconds ($4.5\pm0.8\times10^{-1}\Omega/\square$), 20 seconds ($3.8\pm0.7\times10^{-1}\Omega/\square$), and 30 seconds ($5.1\pm1.4\times10^{-1}\Omega/\square$), respectively. Further, the electric resistivity was 10 seconds ($7.7\pm5.8\times10^{-4}$ $\Omega$ cm), 15 seconds ($3.1\pm0.6\times10^{-4}$ $\Omega$ cm), and 20 seconds ($2.6\pm0.5\times10^{-4}$ $\Omega$ cm), respectively (FIG. 2). The peak of the copper oxide was not detected from the XRD spectrum of the copper film obtained by 20-second sintering (FIG. 4). This confirmed sufficient suppression of oxidation of the copper film. In FIG. 3, in the sintering at 100° C., the evaporation of the solvent and the sintering of copper nanoparticle B took a slightly longer period of time than that in the sintering at 150° C., namely, about 10 to 20 minutes (FIG. 3).

The results revealed that low-temperature sintering at 150° C. or less was possible in the air; that the sintering can be performed by using a versatile heating device, such as a hot plate; and that the sintering was possible at about 150° C. in a short period of time, namely, about 10 to 30 seconds.

Investigation of Average Particle Diameter of Copper Fine Particle A

Example 4

A copper particle mixture was prepared as copper particle mixture A in the same manner as in Example 1, except that copper fine particles having an average particle diameter of 0.96 µm were used, thereby preparing a copper particle mixture-containing ink as a copper particle mixture dispersion.

Example 5

A copper particle mixture was prepared as copper particle mixture A in the same manner as in Example 1, except that copper fine particles having an average particle diameter of 0.75 µm were used, thereby preparing a copper particle mixture-containing ink as a copper particle mixture dispersion.

Example 6

A copper particle mixture was prepared as copper particle mixture A in the same manner as in Example 1, except that copper fine particles having an average particle diameter of 0.52 µm were used, thereby preparing a copper particle mixture-containing ink as a copper particle mixture dispersion.

Example 7

A copper particle mixture was prepared as copper particle mixture A in the same manner as in Example 1, except that copper fine particles having an average particle diameter of 0.30 µm were used, thereby preparing a copper particle mixture-containing ink as a copper particle mixture dispersion.

Figure 5:
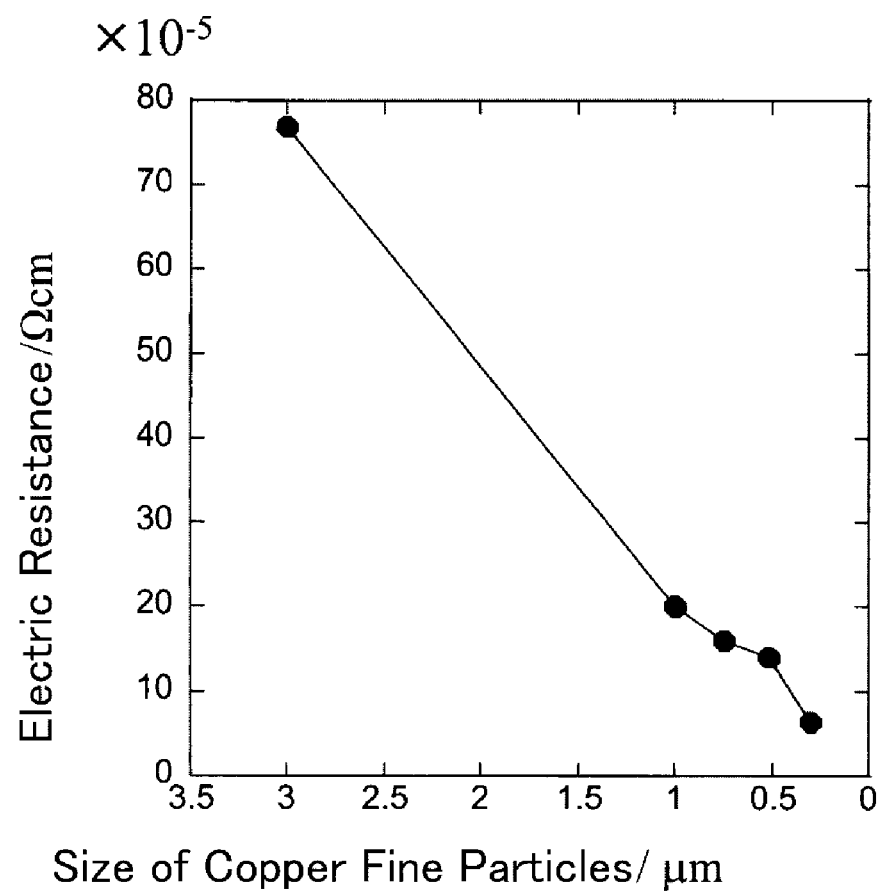
FIG. 5 is a graph showing the results obtained by forming a copper film by sintering in the air at a temperature of 150° C. for 20 seconds using the copper particle mixture-containing ink prepared in Examples 1 and 4 to 7, and measuring the electric resistivity of the film.

Copper films were formed by sintering in the air at a temperature of 150° C. for 20 seconds using the copper particle mixture-containing ink prepared in Examples 1 and 4 to 7. The electric resistivity of each copper film was measured. FIG. 5 shows the results.

The results of FIG. 5 revealed that Example 7 using the 0.30 µm copper fine particles had the lowest resistance.

Investigation of Sintering Temperature: 2

Figure 6:
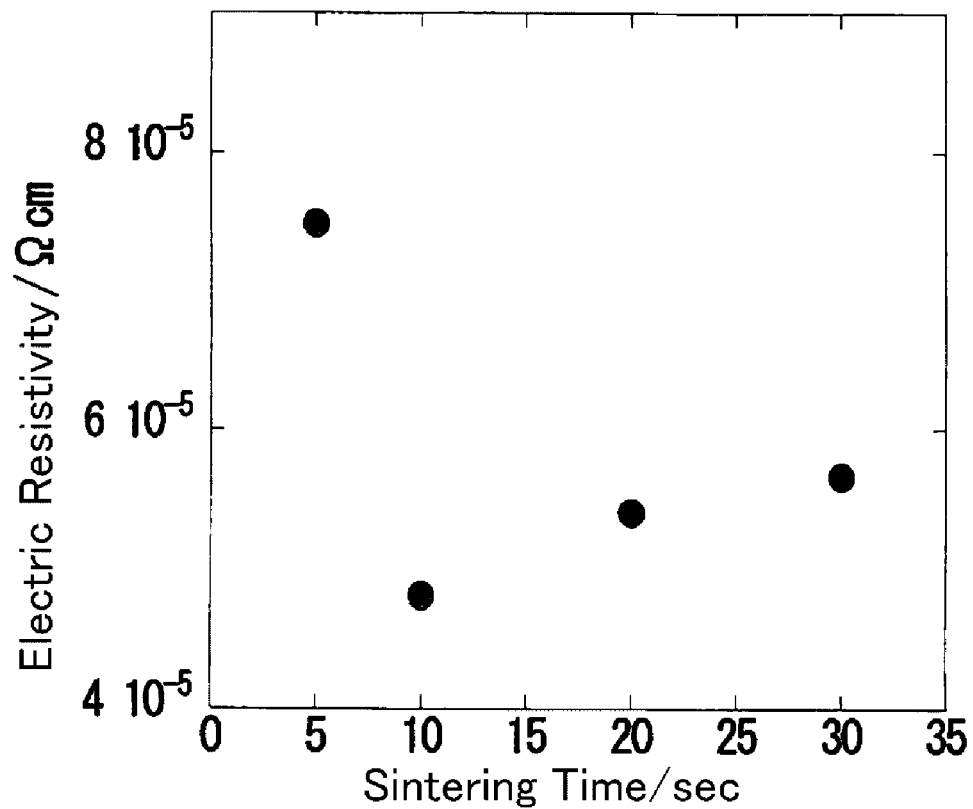
FIG. 6 is a graph showing the results obtained by forming copper films by sintering in the air at a temperature of 150° C. for 5 seconds, 10 seconds, 15 seconds, 20 seconds, or 30 seconds using the copper particle mixture-containing ink prepared in Example 7, and measuring the electric resistivity of each film.
Figure 7:
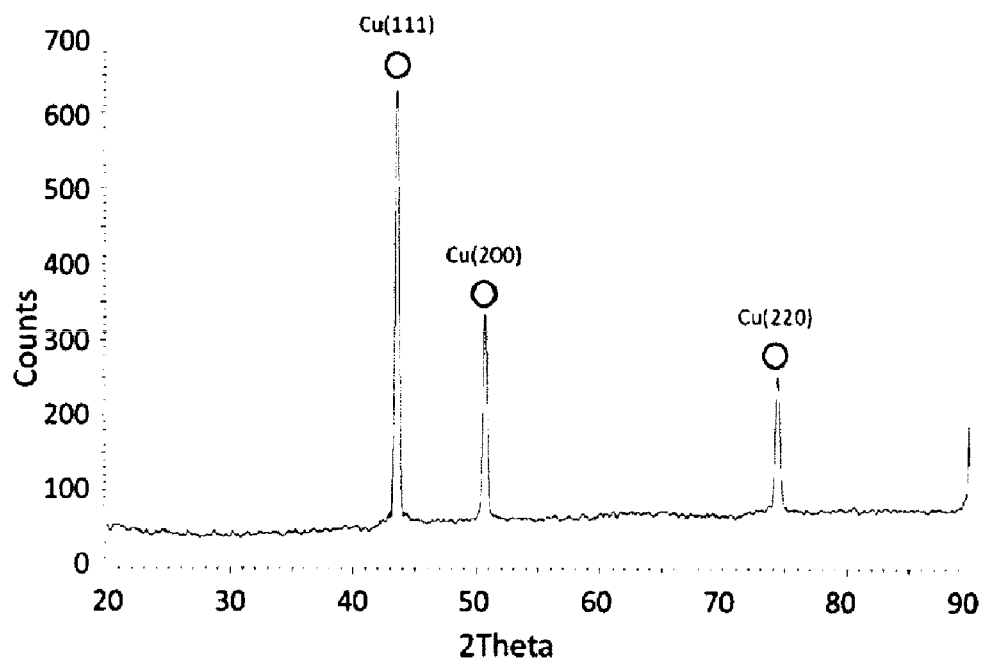
FIG. 7 is a graph showing the results of XRD measurement of a copper film formed by sintering in the air at a temperature of 150° C. for 10 seconds using the copper particle mixture-containing ink prepared in Example 7.
Figure 8:
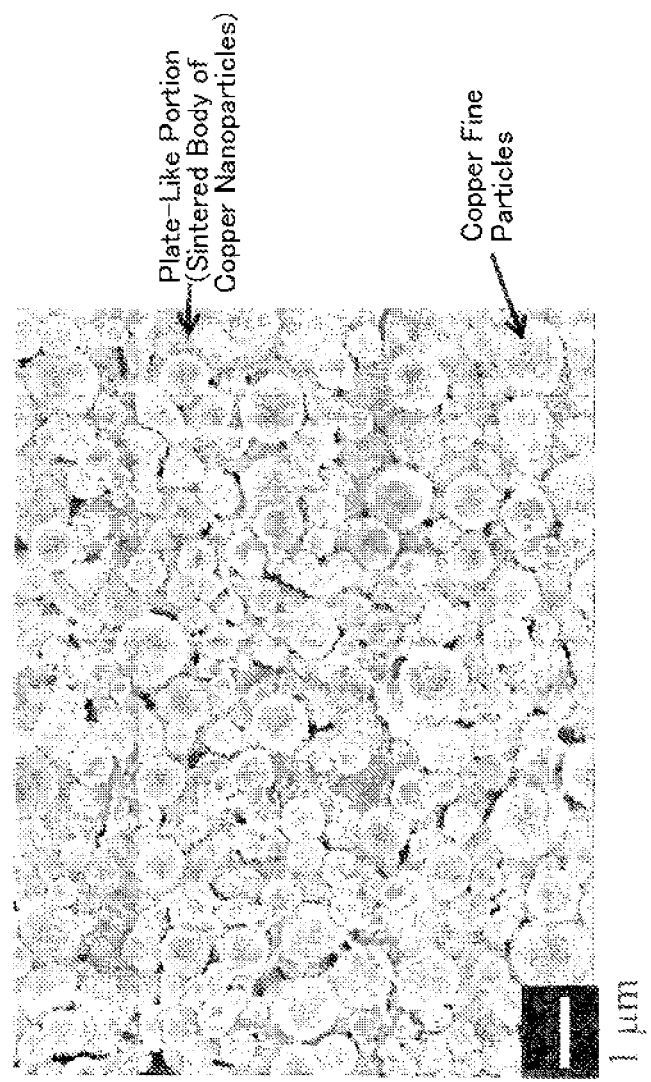
FIG. 8 is an image showing the results of SEM observation of a copper film formed by sintering in the air at a temperature of 150° C. for 10 seconds using the copper particle mixture-containing ink prepared in Example 7.

Copper films were formed from the copper particle mixture-containing ink prepared in Example 7 by performing sintering in the air at a sintering temperature of 150° C. for 5 seconds, 10 seconds, 15 seconds, 20 seconds, or 30 seconds, and the electric resistivity of each film was measured (FIG. 6). An XRD measurement was performed on a copper film formed by heating at 150° C. for 10 seconds (FIG. 7), followed by SEM observation (FIG. 8). FIGS. 6 to 8 show the results.

The results of FIG. 6 revealed that the lowest resistance was obtained in the sintering in a short period of time, i.e., 10 seconds. The color of the copper film was changed from brown (the color of a copper particle mixture-containing ink in which insufficiently sintered particles are dispersed) to pink (the color of sufficiently sintered copper) within about 10 seconds from the beginning of sintering. This indicates that the sintering proceeded with the evaporation of the solvent, which is a substance that inhibits the conduction, by the 10-second sintering, and that the electric resistivity is reduced accordingly (FIG. 6). The peak of the copper oxide was not detected from the XRD spectrum of a copper film subjected to 10-second sintering (FIG. 7). This confirmed sufficient suppression of oxidation of the copper film. The SEM observation revealed that the copper nanoparticles were fused due to the low-temperature sintering property of copper nanoparticles, and thereby served as a binder; the binder connects the copper fine particles to each other, thereby forming a conductive copper film (FIG. 8).

Investigation of Sintering Temperature: 3

Figure 9:
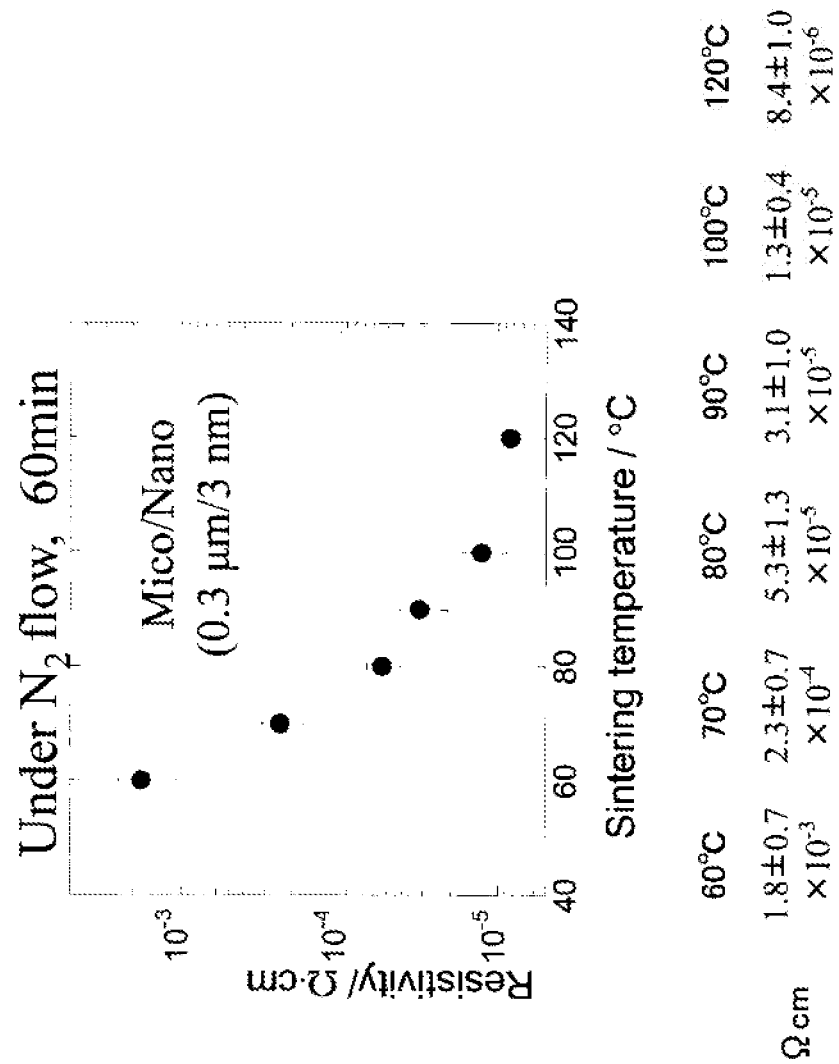
FIG. 9 is a graph showing the results obtained by forming copper films by sintering in an inert atmosphere (nitrogen atmosphere) at a temperature of 60° C., 70° C., 80° C., 90° C., 100° C., or 120° C. for 60 minutes using the copper particle mixture-containing ink prepared in Example 7, and measuring the electric resistivity of each film.
Figure 10:
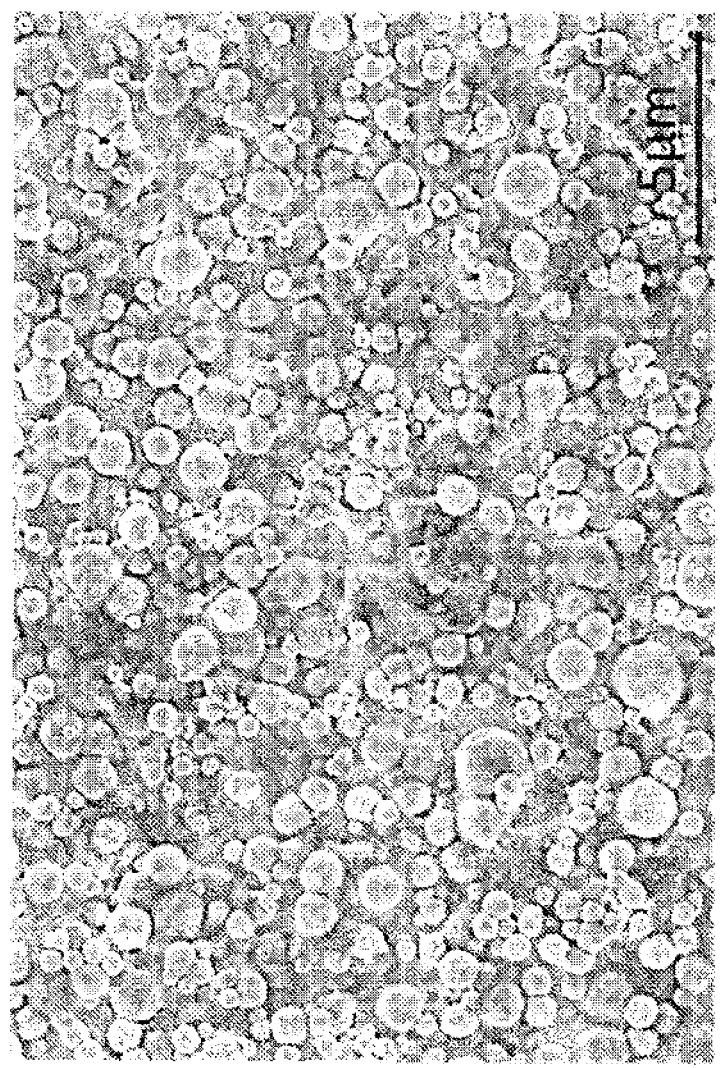
FIG. 10 is an image showing the results of SEM observation of a copper film formed by sintering in the air at a temperature of 80° C. for 60 minutes using the copper particle mixture-containing ink prepared in Example 7.
Figure 11:
FIG. 11 is an image showing the results of SEM observation of a copper film formed by sintering in the air at a temperature of 80° C. for 60 minutes using the copper particle mixture-containing ink prepared in Example 7.

Copper films were formed by sintering in an inert atmosphere (nitrogen atmosphere) at a temperature of 60° C., 70° C., 80° C., 90° C., 100° C., or 120° C. for 60 minutes using the copper particle mixture-containing ink prepared in Example 7, and the electric resistivity of each film was measured (FIG. 9). An SEM observation was performed on a copper film formed by heating at 80° C. for 60 minutes (FIGS. 10 and 11). FIGS. 9 to 11 show the results.

The results of FIG. 9 revealed that the electric resistivity of the copper film was further reduced as the sintering temperature was increased. The value was $1.8\pm0.7\times10^{-3}$ $\Omega$ cm (sheet resistance: $3.6\pm1.4\times10^{0}$ $\Omega$ cm) in the sintering at 60° C. This is presumably because the solvent having a high boiling point remained, and served as a conduction-inhibiting substance. It was revealed that the sintering at 70° C. had a resistance of $2.3\pm0.7\times10^{-4}$ $\Omega$ cm (sheet resistance: $4.7\pm1.4\times10^{-1}$ $\Omega$ cm), and that the sintering was more advanced than that in the sintering at 60° C. The electric resistivity values of the copper films sintered at 80° C., 90° C., and 100° C. were $5.3\pm1.3\times10^{-5}$ $\Omega$ cm (sheet resistance: $1.4\pm0.5\times10^{-1}$ $\Omega$ cm), $3.1\pm1.0\times10^{-5}$ $\Omega$ cm (sheet resistance: $7.8\pm2.6\times10^{-2}$ $\Omega$ cm), and $1.3\pm1.0\times10^{-5}$ $\Omega$ cm (sheet resistance: $3.2\pm1.0\times10^{-2}$ $\Omega$ cm), respectively. This is presumably because of the further progression of sintering and solvent evaporation compared with the sintering at 60° C. and 70° C. The electric resistivity of the copper film sintered at 120° C. was low, namely $8.4\pm1.0\times10^{-6}$ $\Omega$ cm (sheet resistance: $2.0\pm0.3\times10^{-2}$ $\Omega$ cm), which was about five times that of the bulk copper.

The SEM observation of the copper film sintered at 80° C. showed that the copper nanoparticles were fused due to the low-temperature sintering property of copper nanoparticles, and served as a binder; the binder connects the copper fine particles to each other, thereby forming a conductive copper film (FIG. 10). Further, in FIG. 11, it was observed that the gaps between the copper fine particles are filled with the copper film formed by sintering.

It was thus revealed that low-temperature sintering at 120° C. or less was possible in an inert atmosphere; and that a substrate having a low heat resistance, which has been considered unsuitable, can be used.

Comparison with Sintering of Copper Nanoparticles in the Air

Figure 12:
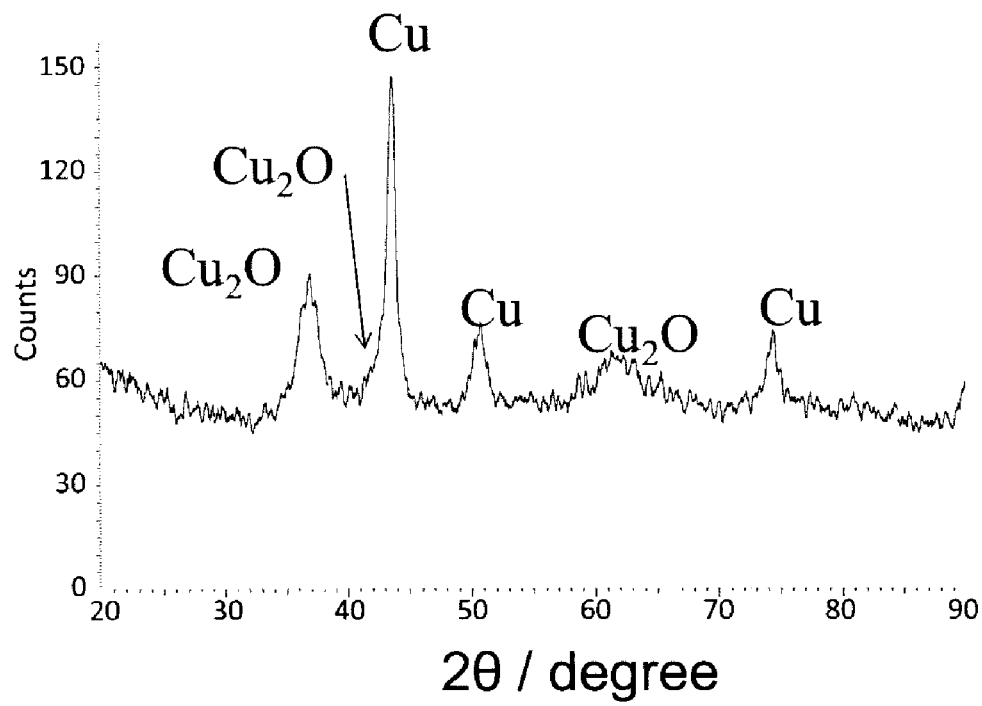
FIG. 12 is a graph showing the results of XRD measurement of a copper film formed by sintering in the air at a temperature of 150° C. for 1 minute using the copper particle mixture-containing ink prepared in Comparative Example 2.

A copper film was formed by sintering at a temperature of 150° C. for 1 minute using the copper nanoparticle-containing ink prepared in Comparative Example 2. The electric resistivity of the copper film was measured. Further, an XRD measurement was performed on the copper film. FIG. 12 shows the results.

The electric resistivity of the copper film was $2.9\pm0.6\times10^{-3}$ $\Omega$ cm, which was higher than that of the copper film formed by using the copper particle mixture-containing ink of the Examples. As is clear from FIG. 12, this is because of the formation of copper oxide.

Verification of Coating of Copper Fine Particle a with Oxalic Acid and Malonic Acid Coating of copper fine particle A with a dicarboxylic acid was verified by the following Reference Examples. The copper particle mixture contains not only copper fine particle A, but also copper nanoparticle B. Therefore, in order to clearly verify that copper fine particle A is coated with a dicarboxylic acid, as shown in the following Reference Examples, copper fine particle A was prepared by adding a dicarboxylic acid to a copper fine particle dispersion that contains copper fine particle A and is free of copper nanoparticles B, and verifying the coating of copper fine particle A with a dicarboxylic acid.

Reference Example 1

Copper fine particles (0.3 μm) were dispersed in propylene glycol as a solvent, and 1 mass % of oxalic acid was added thereto to prepare a copper fine particle dispersion. Using this copper fine particle dispersion, centrifugation was performed at 14000 rpm for 10 minutes, thereby obtaining precipitates of copper fine particles. The precipitates were washed twice with propylene glycol, and then dried under reduced pressure at 50° C. for 3 days to remove the solvent (propylene glycol), thereby preparing copper fine particle powder. The infrared absorption spectrum of the prepared copper fine particle powder was measured.

Reference Example 2

Copper fine particle powder was prepared in the same manner as in Reference Example 1, except that 1 mass % of malonic acid was used instead of 1 mass % of oxalic acid.

Reference Example 3

Copper fine particle powder was prepared in the same manner as in Reference Example 1, except that dicarboxylic acid was not added.

Figure 13:
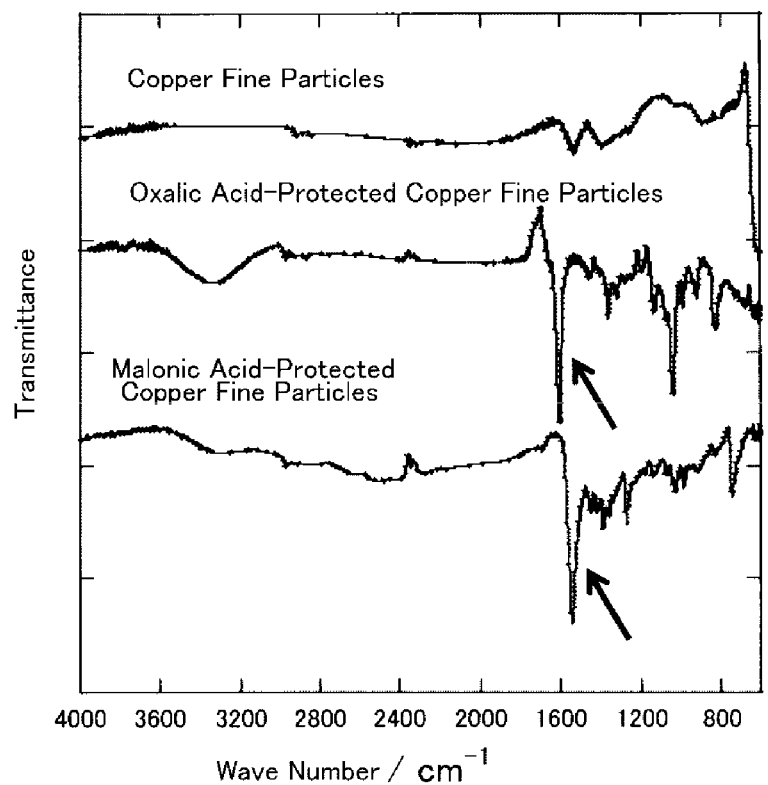
FIG. 13 is a graph showing the results of verification of oxalic acid and malonic acid coating of copper fine particle A in the Examples.

FIG. 13 shows the results.

The results shown in FIG. 13 revealed that by adding oxalic acid or malonic acid to the solvent of the copper fine particle dispersion, a peak derived from carboxylic acid (the arrow in FIG. 13) was confirmed on the surface of the copper fine particles. It was thus revealed that the surfaces of the copper fine particles are coated with oxalic acid or malonic acid by adding oxalic acid or malonic acid to the solvent upon the preparation of the copper fine particle dispersion. It was thus verified that copper fine particle A is coated with malonic acid and/or oxalic acid by adding oxalic acid or malonic acid to the solvent of the copper particle mixture dispersion upon the preparation of the copper particle mixture.

Investigation of Reducing Agent

An investigation was conducted using copper nanoparticles so as to verify the effects of the reducing agent with respect to copper. More specifically, copper films were formed by sintering in an inert atmosphere (nitrogen atmosphere) at a sintering temperature of 100 OC for 60 minutes using the copper nanoparticle-containing inks prepared in Reference Examples 4 to 10, and measuring the electric resistivity of each film (FIG. 14).

Reference Example 4

Figure 14:
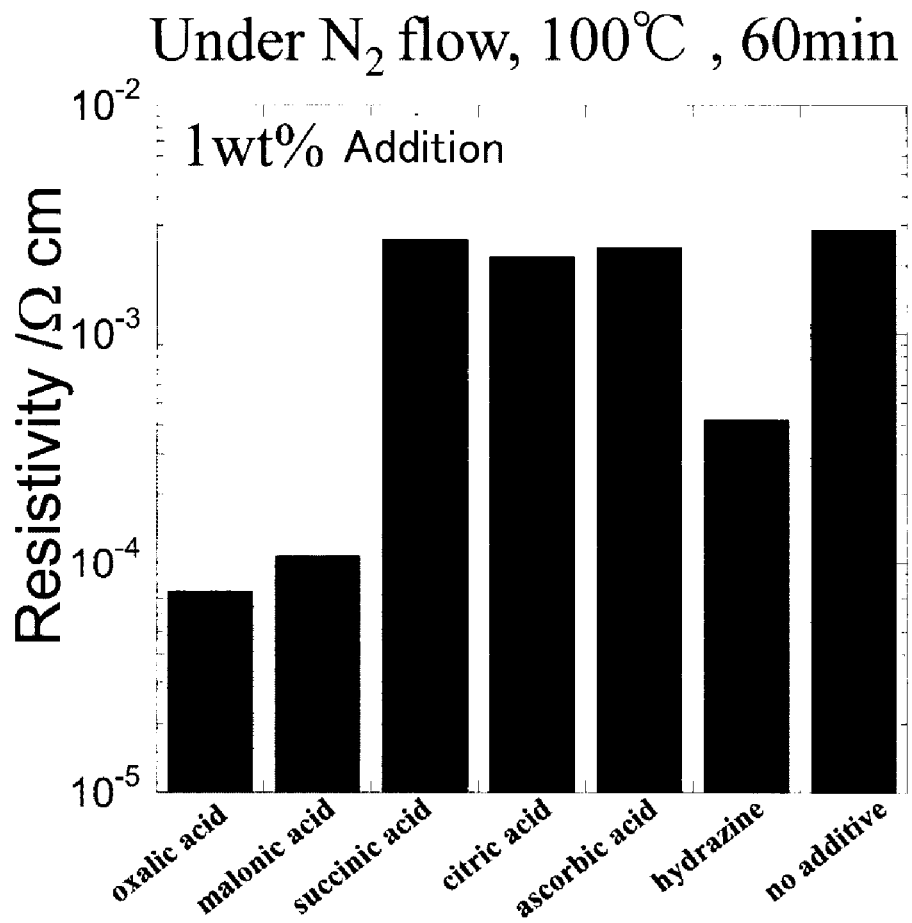
FIG. 14 is a graph showing the results of investigation of reducing agents in the Examples. More specifically.

Copper nanoparticles were prepared; and a copper nanoparticle-containing ink as a copper nanoparticle dispersion was prepared in the same manner as in Example 1, except that copper fine particles were not added (malonic acid in FIG. 14).

Reference Example 5

Copper nanoparticles were prepared; and a copper nanoparticle-containing ink as a copper nanoparticle dispersion was prepared in the same manner as in Reference Example 4, except that oxalic acid was used instead of malonic acid (oxalic acid in FIG. 14).

Reference Example 6

Copper nanoparticles were prepared; and a copper nanoparticle-containing ink as a copper nanoparticle dispersion was prepared in the same manner as in Reference Example 4, except that succinic acid was used instead of malonic acid (succinic acid in FIG. 14).

Reference Example 7

Copper nanoparticles were prepared; and a copper nanoparticle-containing ink as a copper nanoparticle dispersion was prepared in the same manner as in Reference Example 4, except that citric acid was used instead of malonic acid (citric acid in FIG. 14).

Reference Example 8

Copper nanoparticles were prepared; and a copper nanoparticle-containing ink as a copper nanoparticle dispersion was prepared in the same manner as in Reference Example 4, except that ascorbic acid was used instead of malonic acid (ascorbic acid in FIG. 14).

Reference Example 9

Copper nanoparticles were prepared; and a copper nanoparticle-containing ink as a copper nanoparticle dispersion was prepared in the same manner as in Reference Example 4, except that hydrazine was used instead of malonic acid (hydrazine in FIG. 14).

Reference Example 10

Copper nanoparticles were prepared; and a copper nanoparticle-containing ink as a copper nanoparticle dispersion was prepared in the same manner as in Reference Example 4, except that the reducing agent (malonic acid) was not added (no additive in FIG. 14).

FIG. 14 shows the results.

Figure 15:
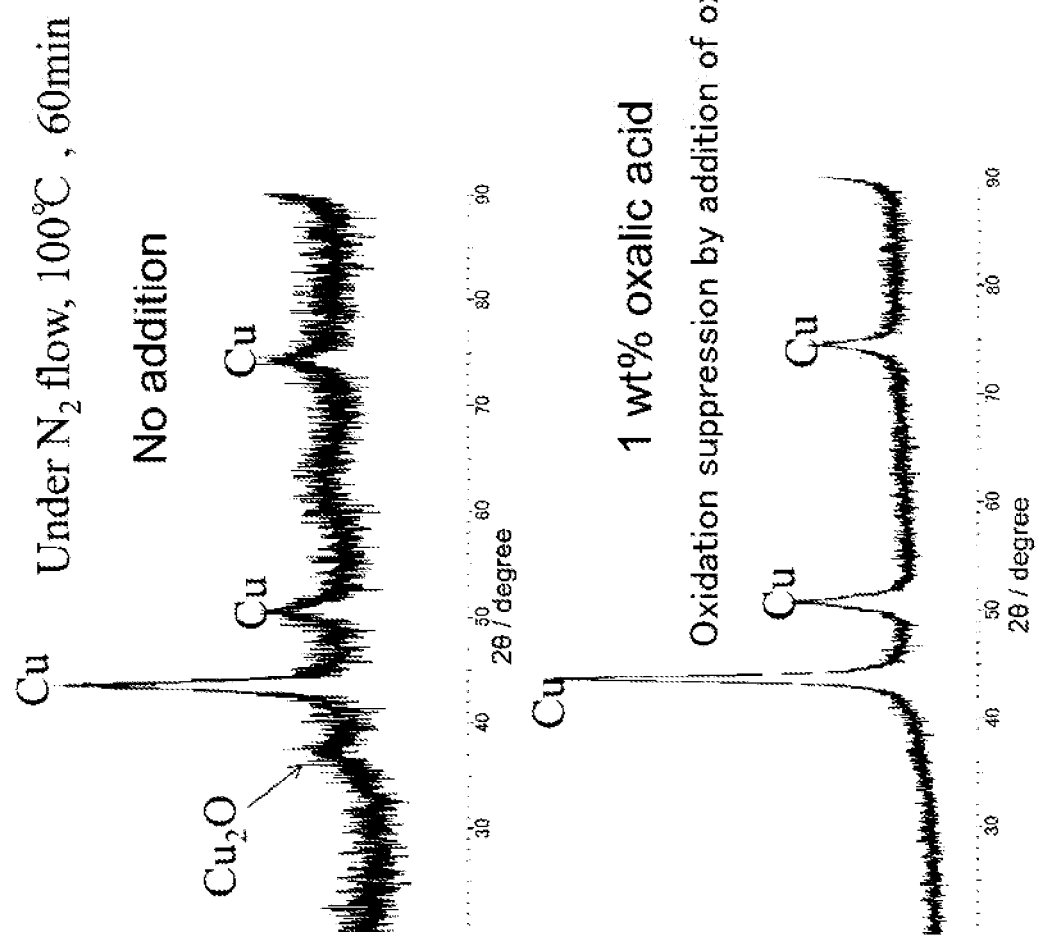
FIG. 15 is graphs showing the results of XRD measurement of copper films formed by sintering under an inert atmosphere (nitrogen atmosphere) at a temperature of 100° C. for 60 minutes using the copper nanoparticle-containing inks prepared in Reference Example 5 (the upper graph of FIG. 15) and Reference Example 10 (the lower graph of FIG. 15).

Further, XRD measurement of copper film was performed for Reference Example 5 (oxalic acid in FIG. 15) and Reference Example 10 (no addition in FIG. 15). FIG. 15 shows the results.

The electric resistivity values of the sintered copper films obtained by using citric acid, ascorbic acid, hydrazine, and malonic acid were $2.2\pm0.4\times10^{-3}$ $\Omega$ cm, $2.4\pm1.0\times10^{-3}$ $\Omega$ cm, $4.2\pm0.4\times10^{-4}$ $\Omega$ cm, and $1.1\pm0.05\times10^{-4}$ $\Omega$ cm, respectively. Among these, Reference Example 4 obtained by using malonic acid had the lowest electric resistivity. This is presumably because citric acid and ascorbic acid remained on the copper film due to their high decomposition temperatures, and thereby served as conduction-inhibiting substances; as a result, their electric resistivity increased. Hydrazine decomposes into nitrogen and water when it acts on the copper oxide on the copper nanoparticle surface as a reducing agent, whereas malonic acid decomposes into acetic acid and carbon dioxide. It is assumed that since these substances hardly remain on the copper film after heating at 100° C. for 60 minutes, the electric resistivity of the resulting sintered copper film was low. Further, by adding formic acid, the aggregation of the copper nanoparticle-containing ink proceeded, thereby decreasing the fluidity. After the application and sintering of this copper nanoparticle-containing ink, many breakages were generated, and the electric conduction failed. This is presumably because the protective layer was peeled off due to the high coordination ability of formic acid with respect to the copper nanoparticles, thereby causing aggregation of the copper nanoparticle-containing ink; the forced application of the aggregated copper nanoparticle-containing ink resulted in the formation of a non-uniform film.

Further, in FIG. 14, oxalic acid (Reference Example 5: n=0), malonic acid (Reference Example 4: n=1), and succinic acid (Reference Example 6: n=2) were used as dicarboxylic acids. The electrical resistivity values of these Reference Examples were $7.5\pm1.5\times10^{-5}$ $\Omega$ cm, $10\pm0.4\times10^{-5}$ $\Omega$ cm, and $260\pm180\times10^{-5}$ $\Omega$ cm, respectively. It was found that the electric resistivity of the copper film can be reduced when, in particular, malonic acid and oxalic acid were used, among various dicarboxylic acids.

The results of Reference Examples 4 to 10 revealed that when malonic acid and oxalic acid were used as a reducing agent, electric resistivity of the copper film was reduced; and that such an electric resistivity reducing effect is remarkable, compared with cases in which other reducing agents were used.

The results shown in FIG. 15 revealed that the peak of copper oxide was not detected in the XRD spectrum of the copper film formed in Reference Example 5 (oxalic acid in FIG. 15). This indicates that the oxidation of the copper film was sufficiently suppressed by using oxalic acid as a reducing agent for copper.

It was also revealed that, in contrast, the detection peak of copper oxide was observed in the XRD spectrum of the copper film formed in Reference Example 10 (no addition in FIG. 15); and that, accordingly, the oxidation of the copper film was not sufficiently suppressed.

The invention claimed is:

1. A copper particle mixture comprising copper fine particle A and copper nanoparticle B, the copper fine particle A having an average particle diameter of not less than 0.1 μm and not more than 0.96 μm and being coated with malonic acid, the copper nanoparticle B comprising a central portion comprising a copper single crystal, and a protective layer surrounding the central portion, and having an average particle diameter of not less than 1 nm and less than 100 nm, and the protective layer of the copper nanoparticle B containing at least one member selected from the group consisting of $C_{3-6}$ primary alcohols, $C_{3-6}$ secondary alcohols, and derivatives thereof.

2. The copper particle mixture according to claim 1, wherein a standard deviation based on particle size distribution of the copper nanoparticle B is 20% or less of the average particle diameter of copper nanoparticle B.

3. The copper particle mixture according to claim 1, wherein the mass ratio of the protective layer in the copper nanoparticle B is 10 to 30 mass %, based on 100 mass % of the copper nanoparticle B.

4. The copper particle mixture according to claim 1, wherein the at least one member selected from the group consisting of $C_{3-6}$ primary alcohols, $C_{3-6}$ secondary alcohols, and derivatives thereof has a group represented by the following formula (1) or (2):

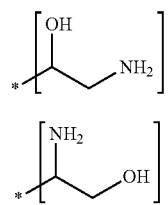

(1)

(2)

wherein in formulas (1) and (2), the asterisk (*) represents a bonding hand.

5. The copper particle mixture according to claim 1, wherein the ratio of the mass (Mb) of the copper nanoparticle B to the total (Ma+Mb) of the mass (Ma) of the copper fine particle A and the mass (Mb) of the copper nanoparticle B is 2 mass % or more.

6. A copper particle mixture dispersion in which the copper particle mixture according to claim 1 is dispersed in a dispersion medium.

7. A copper particle mixture-containing ink comprising the copper particle mixture dispersion according to claim 6.

8. A method for sintering a copper particle mixture, the method comprising sintering the copper particle mixture according to claim 1 in a non-reducing atmosphere under ordinary pressure or reduced pressure, at a temperature of 120° C. or less.

9. A method for sintering a copper particle mixture, the method comprising sintering the copper particle mixture according to claim 1 in the air under ordinary pressure, at a temperature of 150° C. or less.

10. A method for producing a copper particle mixture according to claim 1 comprising copper fine particle A and copper nanoparticle B, the method comprising:
(1) step 1 of preparing a solution in which copper acetate and at least one member selected from the group consisting of $C_{3-6}$ primary alcohols, $C_{3-6}$ secondary alcohols, and derivatives thereof are dissolved in $C_{2-4}$ diol;
(2) step 2 of reducing the solution with hydrazine under atmospheric pressure at 100° C. or less to prepare copper nanoparticle B in the solution; and
(3) step 3 of adding, to the solution containing the copper nanoparticle B, the copper fine particle A, and malonic acid, wherein:
the copper fine particle A has an average particle diameter of not less than 0.1 μm and not more than 0.96 μm, and is coated with malonic acid;
the copper nanoparticle B comprises a central portion comprising a copper single crystal, and a protective layer surrounding the central portion, and has an average particle diameter of not less than 1 nm and less than 100 nm; and
the protective layer of the copper nanoparticle B contains at least one member selected from the group consisting of $C_{3-6}$ primary alcohols, $C_{3-6}$ secondary alcohols, and derivatives thereof.

11. A copper particle mixture consisting essentially of copper fine particle A and copper nanoparticle B, the copper fine particle A having an average particle diameter of not less than 0.1 μm and not more than 5 μm, and being coated with malonic acid, the copper nanoparticle B comprising a central portion comprising a copper single crystal, and a protective layer surrounding the central portion, and having an average particle diameter of not less than 1 nm and less than 100 nm, and the protective layer of the copper nanoparticle B containing at least one member selected from the group consisting of $C_{3-6}$ primary alcohols, $C_{3-6}$ secondary alcohols, and derivatives thereof.

12. A copper particle mixture consisting essentially of copper fine particle A and copper nanoparticle B, the copper fine particle A having an average particle diameter of not less than 0.1 μm and not more than 0.96 μm, and being coated with at least one of oxalic acid and malonic acid, the copper nanoparticle B comprising a central portion comprising a copper single crystal, and a protective layer surrounding the central portion, and having an average particle diameter of not less than 1 nm and less than 100 nm, and the protective layer of the copper nanoparticle B containing at least one member selected from the group consisting of $C_{3-6}$ primary alcohols, $C_{3-6}$ secondary alcohols, and derivatives thereof.

* * * * *